United States Patent
Woodgate et al.

(10) Patent No.: US 7,532,272 B2
(45) Date of Patent: May 12, 2009

(54) SWITCHABLE LENS

(75) Inventors: Graham John Woodgate, Oxfordshire (GB); Jonathan Harrold, Warwickshire (GB)

(73) Assignee: Au Optronics Corp., Hsinchu (TW)

( * ) Notice: Subject to any disclaimer, the term of this patent is extended or adjusted under 35 U.S.C. 154(b) by 571 days.

(21) Appl. No.: 10/544,330

(22) PCT Filed: Feb. 4, 2004

(86) PCT No.: PCT/GB2004/000374

§ 371 (c)(1),
(2), (4) Date: Sep. 16, 2005

(87) PCT Pub. No.: WO2004/070467

PCT Pub. Date: Aug. 19, 2004

(65) Prior Publication Data
US 2006/0098296 A1 May 11, 2006

(30) Foreign Application Priority Data
Feb. 5, 2003 (GB) .................................. 0302658.0

(51) Int. Cl.
*G02F 1/1335* (2006.01)
*G02F 1/1347* (2006.01)

(52) U.S. Cl. .............................. 349/95; 349/15; 349/72; 349/130; 349/132; 349/200

(58) Field of Classification Search .................. 349/15, 349/57, 72, 117, 128, 130, 178, 179, 196, 349/200–202, 96, 193; 359/462, 463, 464, 359/465; 348/51, 56
See application file for complete search history.

(56) References Cited

U.S. PATENT DOCUMENTS 4,850,681 A * 7/1989 Yamanobe et al. .......... 349/201
(Continued)

FOREIGN PATENT DOCUMENTS

EP 0721131 7/1996
(Continued)

OTHER PUBLICATIONS

Suyama, et al., "3-D Display System with Dual-Frequency Liquid-Crystal Varifocal Lens," SID 97 Digest, pp. 273-276.
(Continued)

*Primary Examiner*—Dung Nguyen
*Assistant Examiner*—Tai Duong
(74) *Attorney, Agent, or Firm*—Thomas, Kayden, Horstemeyer & Risley

(57) ABSTRACT

A display apparatus has a switchable birefringent lens array. The display apparatus produces a substantially linearly polarized output. The lens array comprises birefringent material arranged between a planar surface of a first substrate and a relief substrate of a second substrate defining an array of cylindrical lenses. The lens array has electrodes for applying a control voltage across the birefringent material for electrically switching the birefringent material between a first mode and a second mode. In the first mode the lens array modifies the directional distribution of incident light polarized in a predetermined direction. In the second mode the lens array has substantially no effect on incident light polarized in said predetermined direction. In a first aspect, in the first mode, at said relief surface the birefringent material is aligned substantially parallel to the geometrical axis of the cylindrical lenses, and at said planar surface the birefringent material is aligned parallel to the planar surface at a predetermined angle such that the alignment direction twists between the planar surface and the relief surface. In a second aspect, the birefringent material is homeotropically aligned at said at least one relief surface. In a third aspect, the lens array is arranged between a spatial light modulator and the output polarizer of the display device. In a fourth aspect, the lens array receives light from an emissive spatial light modulator which is arranged to output light which is substantially linearly polarized in each pixel. In a fifth aspect a voltage controller controls the voltage across the electrodes to switch between the first and second modes so as to compensate for variations in the temperature of the lens array apparatus, whereby the operating temperature range can be extended.

37 Claims, 12 Drawing Sheets

U.S. PATENT DOCUMENTS

| | | | |
|---|---|---|---|
| 4,959,641 A | | 9/1990 | Bass et al. |
| 5,029,982 A | * | 7/1991 | Nash ........................ 349/72 |
| 5,253,074 A | * | 10/1993 | Wortel et al. ................ 348/761 |
| 5,930,044 A | | 7/1999 | Schleipen |
| 6,020,946 A | * | 2/2000 | Callegari et al. ............ 349/124 |
| 6,069,650 A | * | 5/2000 | Battersby ..................... 348/59 |
| 6,535,256 B1 | * | 3/2003 | Ishihara et al. ................. 349/5 |
| 2007/0008617 A1 | * | 1/2007 | Shestak et al. .............. 359/455 |

FOREIGN PATENT DOCUMENTS

| | | |
|---|---|---|
| EP | 0829743 | 3/1998 |
| EP | 0829744 | 3/1998 |
| EP | 0833183 | 4/1998 |
| JP | 2063005 | 3/1990 |
| WO | WO 98/21620 | 5/1998 |
| WO | WO 03/15424 | 2/2003 |
| WO | WO 03/053071 | 6/2003 |

OTHER PUBLICATIONS

Eichenlaub, "Developments in Autostereoscopic Technology at Dimension Technologies Inc.," SPIE vol. 1915 Stereoscopic Displays and Applications IV, 1993, pp. 177-186.

Commander, et al., "Electrode Designs for Tunable Microlenses," Microlens Arrays, EOS Topical Meeting, May 1997, National Physical Laboratories, pp. 48-53.

Okoshi, "Three Dimensional Imaging Techniques," Academic Press, 1976.

Van Berkel, et al., "Multiview 3D-LCD," Proc. SPIE, vol. 2653, 1996, pp. 32-39.

Bryan-Brown, et al., "Grating Aligned Bistable Nematic Device," SID 97 digest, 1997, pp. 37-40.

Contoret, et al., "Polarized Electroluminescence from an Anisotropic Nematic Network on a Non-Contact Photoalignment Layer," Advanced Materials, vol. 12, No. 13, Jul. 5, 2000, pp. 971-974.

* cited by examiner

SWITCHABLE LENS

The present invention relates to optical display apparatus, in particular switchable active lenses for display apparatus. Such a switchable active lens may be used to provide: a switchable two dimensional (2D)/three dimensional (3D) autostereoscopic display apparatus; a switchable high brightness reflective display system; or a multi-user display system. Such display systems may be used in computer monitors, telecommunications handsets, digital cameras, laptop and desktop computers, games apparatuses, automotive and other mobile display applications.

3D Displays

Normal human vision is stereoscopic, that is each eye sees a slightly different image of the world. The brain fuses the two images (referred to as the stereo pair) to give the sensation of depth. Three dimensional stereoscopic displays replay a separate, generally planar, image to each of the eyes corresponding to that which would be seen if viewing a real world scene. The brain again fuses the stereo pair to give the appearance of depth in the image.

FIG. 1a shows in plan view a display surface in a display plane 1. A right eye 2 views a right eye homologous image point 3 on the display plane and a left eye 4 views a left eye homologous point 5 on the display plane to produce an apparent image point 6 perceived by the user behind the screen plane.

FIG. 1b shows in plan view a display surface in a display plane 1. A right eye 2 views a right eye homologous image point 7 on the display plane and a left eye 4 views a left eye homologous point 8 on the display plane to produce an apparent image point 9 in front of the screen plane.

FIG. 1c shows the appearance of the left eye image 10 and right eye image 11. The homologous point 5 in the left eye image 10 is positioned on a reference line 12. The corresponding homologous point 3 in the right eye image 11 is at a different relative position 3 with respect to the reference line 12. The separation 13 of the point 3 from the reference line 12 is called the disparity and in this case is a positive disparity for points which will lie behind the screen plane.

For a generalised point in the scene there is a corresponding point in each image of the stereo pair as shown in FIG. 1a. These points are termed the homologous points. The relative separation of the homologous points between the two images is termed the disparity; points with zero disparity correspond to points at the depth plane of the display. FIG. 1b shows that points with uncrossed disparity appear behind the display and FIG. 1c shows that points with crossed disparity appear in front of the display. The magnitude of the separation of the homologous points, the distance to the observer, and the observer's interocular separation gives the amount of depth perceived on the display.

Stereoscopic type displays are well known in the prior art and refer to displays in which some kind of viewing aid is worn by the user to substantially separate the views sent to the left and right eyes. For example, the viewing aid may be colour filters in which the images are colour coded (e.g. red and green); polarising glasses in which the images are encoded in orthogonal polarisation states; or shutter glasses in which the views are encoded as a temporal sequence of images in synchronisation with the opening of the shutters of the glasses.

Autostereoscopic displays operate without viewing aids worn by the observer. In autostereoscopic displays, each of the views can be seen from a limited region in space as illustrated in FIG. 2.

FIG. 2a shows a display device 16 with an attached parallax optical element 17. The display device produces a right eye image 18 for the right eye channel. The parallax optical element 17 directs light in a direction shown by the arrow 19 to produce a right eye viewing window 20 in the region in front of the display. An observer places their right eye 22 at the position of the window 20. The position of the left eye viewing window 24 is shown for reference. The viewing window 20 may also be referred to as a vertically extended optical pupil.

FIG. 2b shows the left eye optical system. The display device 16 produces a left eye image 26 for the left eye channel. The parallax optical element 17 directs light in a direction shown by the arrow 28 to produce a left eye viewing window 30 in the region in front of the display. An observer places their left eye 32 at the position of the window 30. The position of the right eye viewing window 20 is shown for reference.

The system comprises a display and an optical steering mechanism. The light from the left image 26 is sent to a limited region in front of the display, referred to as the viewing window 30. If an eye 32 is placed at the position of the viewing window 30 then the observer sees the appropriate image 26 across the whole of the display 16. Similarly the optical system sends the light intended for the right image 18 to a separate window 20. If the observer places their right eye 22 in that window then the right eye image will be seen across the whole of the display. Generally, the light from either image may be considered to have been optically steered (i.e. directed) into a respective directional distribution.

FIG. 3 shows in plan view a display device 16,17 in a display plane 34 producing the left eye viewing windows 36,37,38 and right eye viewing windows 39,40,41 in the window plane 42. The separation of the window plane from the display is termed the nominal viewing distance 43. The windows 37,40 in the central position with respect to the display are in the zeroth lobe 44. Windows 36,39 to the right of the zeroth lobe 44 are in the +1 lobe 46, while windows 38,41 to the left of the zeroth lobe are in the −1 lobe 48.

The viewing window plane of the display represents the distance from the display at which the lateral viewing freedom is greatest. For points away from the window plane, there is a diamond shaped autostereoscopic viewing zone, as illustrated in plan view in FIG. 3. As can be seen, the light from each of the points across the display is beamed in a cone of finite width to the viewing windows. The width of the cone may be defined as the angular width.

If an eye is placed in each of a pair viewing zones such as 37,40 then an autostereoscopic image will be seen across the whole area of the display. To a first order, the longitudinal viewing freedom of the display is determined by the length of these viewing zones.

The variation in intensity 50 across the window plane of a display (constituting one tangible form of a directional distribution of the light) is shown with respect to position 51 for idealised windows in FIG. 4a. The right eye window position intensity distribution 52 corresponds to the window 41 in FIG. 3, and intensity distribution 53 corresponds to the window 37, intensity distribution 54 corresponds to the window 40 and intensity distribution 55 corresponds to the window 36.

FIG. 4b shows the intensity distribution with position schematically for more realistic windows. The right eye window position intensity distribution 56 corresponds to the window 41 in FIG. 3, and intensity distribution 57 corresponds to the window 37, intensity distribution 58 corresponds to the window 40 and intensity distribution 59 corresponds to the window 36.

The quality of the separation of images and the extent of the lateral and longitudinal viewing freedom of the display is determined by the window quality, as illustrated in FIG. 4. FIG. 4a shows the ideal viewing windows while FIG. 4b is a schematic of the actual viewing windows that may be outputted from the display. Several artefacts can occur due to inadequate window performance. Cross talk occurs when light from the right eye image is seen by the left eye and vice versa. This is a significant 3D image degradation mechanism which can lead to visual strain for the user. Additionally, poor window quality will lead to a reduction in the viewing freedom of the observer. The optical system is designed to optimised the performance of the viewing windows.

The parallax optical element may be a parallax barrier. The display comprises a backlight, an array of electronically adjustable pixels (known as a Spatial Light Modulator, SLM) arranged in columns and rows and a parallax barrier attached to the front of the display as illustrated in plan view in FIG. 5.

Parallax barriers rely on blocking the light from regions of the display and therefore reduce the brightness and device efficiency, generally to approximately 20-40% of the original display brightness. Parallax barriers are not readily removed and replaced due to the requirements of sub-pixel alignment tolerances of the barrier with respect to the pixel structure of the display in order to optimise the viewing freedom of the display. The 2D mode is half resolution.

Another type of parallax optic (cf. parallax barriers) well known in the art for use in stereoscopic displays is called the lenticular screen, which is an array of vertically extended cylindrical microlenses. The term "cylindrical" as used herein has its normal meaning in the art and includes not only strictly spherical lens shapes but also aspherical lens shapes. The pitch of the lenses corresponds to the viewpoint correction condition, that is the pitch of the parallax barrier is slightly smaller than twice the pitch of the pixel array in order to steer the light from each pixel to the viewing window. In such a display, the resolution of each of the stereo pair images is half the horizontal resolution of the base LCD, and two views are created.

The curvature of the lenses is set substantially so as to produce an image of the LCD pixels at the window plane. As the lenses collect the light in a cone from the pixel and distribute it to the windows, lenticular displays have the full brightness of the base panel.

FIG. 6 shows a typical structure for a lenticular display device using a lenticular array. A backlight 60 produces a light output 62 which is incident on an LCD input polariser 64. The light is transmitted through a TFT LCD substrate 66 and is incident on a repeating array of pixels arranged in columns and rows in an LCD pixel plane 67. The red pixels 68,71,73, green pixels 69,72,75 and blue pixels 70,73 each comprise an individually controllable liquid crystal layer and are separated by regions of an opaque mask called a black mask 76. Each pixel comprises a transmissive region, or pixel aperture 78. Light passing through the pixel is modulated in phase by the liquid crystal material in the LCD pixel plane 74 and in colour by a colour filter positioned on an LCD colour filter substrate 80. The light then passes through an output polariser 82 after which is placed a parallax barrier 84 and a parallax barrier substrate 86. The parallax barrier 84 comprises an array of vertically extended transmissive regions separated by vertically extended opaque regions and serves to direct light from alternate pixel columns 69,71,73,75 to the right eye as shown by the ray 88 for light from pixel 69 and from the intermediate columns 68,70,72,74 to the left eye as shown by the ray 90 (this overall light direction pattern forming another example of a directional distribution of light). The observer sees the light from the underlying pixel illuminating the aperture of the barrier, 92. The light then passes through a lenticular screen substrate 94 and a lenticular screen 96 which is formed on the surface of the lenticular screen substrate 92. As for the parallax barrier, the lenticular screen 94 serves to direct light from alternate pixel columns 69,71,73,75 to the right eye as shown by the ray 88 from the pixel 69 and from the intermediate columns 68,70,72,74 to the left eye as shown by the ray 90 from pixel 68. The observer sees the light from the underlying pixel illuminating the aperture of the individual lenticule, 98 of the lenticular screen 96. The extent of the captured light cone is shown by the captured rays 100.

Lenticular displays are described in T. Okoshi "Three Dimensional Imaging Techniques", Academic Press, 1976. One type of lenticular display using a spatial light modulator is described in U.S. Pat. No. 4,959,641, in particular non-switching lenticular elements in air.

A lenticular display using cylindrical lenses that are tilted with respect to columns of pixels of a display is described in "multiview 3D-LCD" published in SPIE Proceedings Vol. 2653, 1996, pages 32 to 39.

The viewing freedom of the flat panel displays described above is limited by the window structure of the display.

A display in which the viewing freedom is enhanced by measuring the position of an observer and moving the parallax element in correspondence is described in EP-0,829,743. Such an observer measurement apparatus and mechanical actuation is expensive and complex.

A display in which the window optical structure is not varied (a fixed parallax optic display for example) and the image data is switched in correspondence to the measured position of the observer such that the observer maintains a substantially orthoscopic image is described for example in EP-0,721,131.

As described above, the use of parallax optics to generate a spatially multiplexed 3D display limits the resolution of each image to at best half of the full display resolution. In many applications, the display is intended to be used for a fraction of the time in the 3D mode, and is required to have a full resolution artefact free 2D mode.

One type of display in which the effect of the parallax optic is removed is Proc.SPIE vol. 1915 Stereoscopic Displays and Applications IV (1993) pp 177-186, "Developments in Autostereoscopic Technology at Dimension Technologies Inc.", 1993. In this case, a switchable diffuser element is placed in the optical system used to form the light lines. Such a switchable diffuser could be for example of the Polymer Dispersed Liquid Crystal type in which the molecular arrangement switches between a scattering and non-scattering mode on the application of an applied voltage across the material. In the 3D mode, the diff-user is clear and light lines are produced to create the rear parallax barrier effect. In the 2D mode, the diffuser is scattering and the light lines are washed out, creating the effect of a uniform light source. In this way, the output of the display is substantially Lambertian and the windows are washed out. An observer will then see the display as a full resolution 2D display. Such a display suffers from Fresnel diffraction artefacts in the 3D mode, as well as from unwanted residual scatter in the diffuser's clear state which will increase the display cross-talk. Therefore, such a display is likely to exhibit higher levels of visual strain.

In another type of switchable 2D-3D display disclosed in EP-0,833,183, a second LCD is placed in front of the display to serve as a parallax optic. In a first mode, the parallax LCD is clear so that no windows are produced and an image is seen in 2D. In a second mode, the device is switched so as to produce slits of a parallax barrier. Output windows are then created and the image appears to be 3D. Such a display has increased cost and complexity due to the use of two LCD elements as well as being of reduced brightness or having increased power consumption. If used in a reflective mode 3D display system, parallax barriers result in very poor brightness due to attenuation of light by the blocking regions of the parallax barrier both on the way in and out of the display.

In another type of switchable 2D-3D display disclosed in EP-0,829,744, a parallax barrier comprises a patterned array of half wave retarder elements. The pattern of retarder elements corresponds to the pattern of barrier slits and absorbing regions in a parallax barrier element. In a 3D mode of operation, a polariser is added to the display so as to analyse the slits of the patterned retarder. In this way, an absorbing parallax barrier is produced. In the 2D mode of operation, the polariser is completely removed as there is no involvement of any polarisation characteristics in the 2D mode of operation. Thus the output of the display is full resolution and full brightness. One disadvantage is that such a display uses parallax barrier technology and thus is limited to perhaps 20-30% brightness in the 3D mode of operation. Also, the display will have a viewing freedom and cross talk which is limited by the diffraction from the apertures of the barrier.

It is known to provide electrically switchable birefringent lenses for purposes of switching light directionally. It is known to use such lenses to switch a display between a 2D mode of operation and a 3D mode of operation.

For example, electrically switchable birefringent liquid crystal microlenses are described in European Optical Society Topical Meetings Digest Series: 13, 15-16 May 1997 L. G. Commander et al "Electrode designs for tuneable microlenses" pp 48-58.

In another type of switchable 2D-3D display disclosed in U.S. Pat. No. 6,069,650 and WO-98/21620, switchable microlenses comprising a lenticular screen filled with liquid crystal material are used to change the optical power of a lenticular screen. U.S. Pat. No. 6,069,650 and WO-98/21620 teach the use of an electro-optic material in a lenticular screen whose refractive index is switchable by selective application of an electric potential between a first value whereby the light output directing action of the lenticular means is provided and a second value whereby the light output directing action is removed.

A 3D display comprising a liquid crystal Fresnel lens is described in S. Suyama et al "3D Display System with Dual Frequency Liquid Crystal Varifocal Lens", SID 97 DIGEST pp 273-276.

In a first aspect the present invention provides for polarisation matching between the output of a display device and the alignment direction in an active lens.

In one form of the first aspect of the present invention, there is provided a switchable birefringent lens array for a display apparatus producing a substantially linearly polarised output, the lens array comprising:

birefringent material arranged between a planar surface and a relief surface defining an array of cylindrical lenses; and electrodes for applying a control voltage across the birefringent material for electrically switching the birefringent material between a first mode and a second mode, the lens array being arranged in said first mode to modify the directional distribution of incident light polarised in a predetermined direction and in said second mode to have substantially no effect on incident light polarised in said predetermined direction, wherein:

in the first mode, at said relief surface the birefringent material is aligned parallel to the geometrical axis of the cylindrical lenses; and in the first mode, at said planar surface the birefringent material is aligned parallel to the planar surface at a predetermined angle such that in the first mode, the alignment direction twists between the planar surface and the relief surface.

It is advantageous for the alignment direction of the birefringent material to be parallel to the geometric axis of the cylindrical lenses, because this avoids dislocations at the relief surface due to competition between the alignment layer surface energy and the surface relief structure alignment surface energy, which dislocations might cause scatter, increase optical crosstalk, reduce lens contrast and/or increase relaxation times. It also simplifies manufacture, allowing the use of known manufacturing techniques.

A lens array according to the first aspect the present invention has the unexpected advantage that substantially achromatic polarisation guiding will take place in the birefringent material because of their relatively high optical thickness in practical systems. In other words the polarisation direction rotates as the light passes through the birefringent material. This guiding effect can be used to control the polarisation of the device in the lens array.

Such rotation of the polarisation direction by the lens array means that no additional waveplate is required between the display and the active lens (although optionally one or more waveplates may be added), thus allowing the viewing distance of the element to be reduced in the first mode of operation and the device cost to be reduced.

The alignment may be provided by any suitable means, for example alignment layers.

In another form of the first aspect of the present invention, there is provided a directional display apparatus comprising:

a substantially linearly polarised output display device; and a switchable birefringent cylindrical lens arranged in a first mode to modify the directional distribution of the polarised output display device and in a second mode to substantially cause no modification of the directional distribution of the display device comprising:

a surface relief layer defining a cylindrical microlens array, an alignment layers formed on the surface relief layer such that the alignment of the birefringent material at the surface relief surface the first mode of operation is substantially parallel to the geometric axis of the cylindrical lenses; and electrode layers arranged to switch the orientation of the birefringent material between at least a first and second orientation for first and second modes respectively, the alignment of the birefringent material at the planar substrate being aligned in cooperation with the output polarisation of the display device so that in the first mode of operation the polarisation is transmitted through the birefringent material with a twist to be substantially parallel to the geometric axis of the cylindrical microlens array at the surface relief surface.

Preferably, one or more of the following optional features are present:

the birefringent material is a liquid crystal.

the alignment direction at the planar substrate is parallel or orthogonal to the output polarisation of the display device.

the substantially polarised display may comprise a partially polarised or unpolarised display and a polariser element.

the display may be a spatial light modulator for non-display directionality switching applications.

there is a twist of the polarisation state passing through the lens in the first mode.

the twist of the polarisation state is 45 degrees, −45 degrees or 135 degrees additional waveplates may be incorporated between the display device and the active lens to rotate the output polarisation of the substantially polarised display.

Thus, hereinafter described embodiments of the present invention provide one or more of the following advantages:

The alignment direction of the liquid crystal can be parallel to the geometric axis of the surface relief cylindrical microlenses.

The lens surface is convenient to manufacture with known surface alignment techniques.

No additional waveplate is required between the display and the active lens, thus the viewing distance of the element can be reduced in the 3D mode of operation and the device cost reduced.

Disclinations will not be encountered in the switching lens due to competition between the alignment layer surface energy and the surface relief structure alignment surface energy.

The contrast of the active lens cell will be optimized.

The switching response time is minimized.

Degeneracy in the lens element is minimized, so that the device switches uniformly.

The invention has the unexpected advantage that polarisation guiding will take place in the lenses because of their relatively high optical thickness in practical systems. This guiding effect can be used to control the polarisation of the device in the active lens.

The display can produce high brightness in 2D and 3D modes with a fixed liquid crystal display output polarisation state.

In a second aspect, the present invention provides for lens arrays having homeotropically aligned birefringent material.

In one form of the second aspect of the present invention, there is provided a switchable birefringent lens array for a display apparatus producing a substantially linearly polarised output, the lens array comprising:

birefringent material arranged between a surface at least one of which is a relief surface defining an array of cylindrical lenses; and electrodes for applying a control voltage across the birefringent material for electrically switching the birefringent material between a first mode and a second mode, the lens array being arranged in said first mode to modify the directional distribution of incident light polarised in a predetermined direction and in said second mode to have substantially no effect on incident light polarised in said predetermined direction, wherein the birefringent material is homeotropically aligned at said at least one relief surface.

Such a lens array has the advantage that it may be configured so as not require any power consumption in the second mode of operation. This is because in the absence of a control voltage the birefringent material is aligned parallel to the optical axis, whereby the light experiences the ordinary refractive index of the birefringent material at the relief surface, which most conveniently is the second mode of operation in which there is substantially no effect on the incident light.

For example, in a display device switchable between a 2D mode and an autostereoscopic 3D mode, this means that the 2D mode does not require power consumption. Therefore 2D operating time on batteries would be unaffected. In an active lens, because lens depths tend to be of the order of tens of microns, the voltage that needs to be applied to switch the thick parts of the cell is substantially in excess of the standard liquid crystal cell operating voltages, for example 5V for 5 μm thick cells. Therefore the power consumption of the liquid crystal in the driven mode for this kind of lens cell is significantly higher than the power consumption of a standard 5 μm thick LCD using the same liquid crystal and driving frequency. Therefore it is undesirable to have a 2D driven mode. If the lens switch is damaged, the default mode of operation is in the 2D mode, and so no degradation to the image will be seen. The focal length of the lenses can be tuned in the 3D mode by modifying the voltage to suit the desired window appearance.

The alignment may be provided by any suitable means, for example an alignment layer. Homeotropic alignment layers allow the use of readily available polymer materials to form the lens surface without excessively high refractive indices. Such polymer materials do not suffer from high cost, high toxicity and difficult processing regimes.

In another form of the second aspect of the present invention, there is provided an optical switching apparatus comprising a switchable birefringent lens comprising a birefringent optical material and a first substrate wherein:

a first homeotropic alignment layer is formed on the surface relief structure; and the dielectric anisotropy of the birefringent material is less than zero, such that the switchable lens operates in the first mode when an electric field is applied to the cell and in a second mode when no electric field is applied to the cell. Preferably, one or more of the following optional features are present:

in the first mode, the alignment of the birefringent material optical axis at the surface relief structure is substantially parallel to the geometric microlens axis.

which alignment is provided by a homogeneous bias of the alignment layer which alignment is provided by a homogeneous bias provided by a grooved structure the alignment at the planar substrate
is homeotropic
is homogeneous;
comprises homeotropic and homogenous alignment such that it shows homogeneous alignment properties in a first mode and homeotropic alignment properties in a second mode.
provides a twist of the incident polarisation state in the first mode of operation such that the polarisation state at the surface relief structure is parallel to the birefringent lens optical axis.

a waveplate is positioned between the display device and the planar substrate such that the polarisation angle at the planar substrate is parallel to the polarisation angle at the surface relief substrate.

In one form of the third aspect of the present invention, there is provided a display apparatus comprising:

a display device having a spatial light modulator and an output polariser; and an electrically switchable birefringent lens array arranged to receive light from the spatial light modulator, wherein the lens array is arranged between the spatial light modulator and the output polariser of the display device.

Such a display device provides a reduced viewing distance as compared to the output polariser being arranged immediately on the output side of the spatial light modulator which is its normal position. This is because the absence of the output polariser between the spatial light modulator and the lens array allows the distance therebetween to be reduced.

The third aspect of the invention is applicable to any type of display device including a spatial light modulator and an output polariser. It is particularly advantageous for a spatial light modulator, such as a liquid crystal modulator, which is arranged to phase modulate the polarisation of the incident light so as to cause ellipticity and rotation of the major axis of polarisation of light at each pixel by a modulated amount, the output polariser being, used to select light polarised in a predetermined direction, whereby the amount of ellipticity and rotation modulates the amplitude of the output light. However, the third aspect may alternatively be applied to an emissive spatial light modulator, for example which produces an unpolarised output, the output polariser being used to polarise the output, or which produces a polarised output, the output polariser being a clean-up polariser.

In another form of the third aspect of the invention, there is provided a directional display apparatus comprising:

a substantially linearly polarised output display device an active lens comprising switchable birefringent cylindrical lens arranged in a first mode to modify the directional distribution of the polarised output display device and in a second mode to substantially cause no modification of the directional distribution of the display device, where the active lens is positioned between the pixel plane and an output polariser of the display device.

In one form of the fourth aspect of the present invention, there is provided a display apparatus comprising:

an emissive spatial light modulator which is arranged to output light which is substantially linearly polarised in each pixel of the spatial light modulator; and an electrically switchable birefringent lens array arranged to receive light from the spatial light modulator.

In another form of the fourth aspect of the invention, there is provided an emissive light direction switching apparatus, comprising:

an optical switching apparatus comprising a switchable birefringent lens comprising a switchable birefringent optical material; and an emissive spatial light modulator apparatus comprising an array of emitting pixel regions each with a substantially polarised optical output.

Such a display apparatus can be configured with high optical efficiency.

In one form of a fifth aspect of the present invention, there is provided an active birefringent lens array apparatus for a display apparatus comprising:

a birefringent material and a substantially isotropic material having relief surface therebetween defining an array of lenses;

electrodes for applying a control voltage across the birefringent material for electrically switching the birefringent material between a first mode and a second mode, the lens array being arranged in said first mode to modify the directional distribution of incident light polarised in a predetermined direction and in said second mode to have substantially no effect on incident light polarised in said predetermined direction; and a voltage controller for controlling the voltage across the electrodes to switch between the first and second mode, the voltage controller being arranged to adjust the voltage applied in the first and second mode to compensate for variations in the temperature of the lens array apparatus.

The refractive index of the isotropic material and also the ordinary and extraordinary refractive indices of the birefringent material vary with temperature. Thus a lens array designed to operate at one temperature may have poor optical properties at another temperature. However, voltage control allows for compensation of the variations with temperature. This improves the optical performance and allows operation of the lens array across a broader operation temperature range.

In one type of apparatus, a temperature sensor is used to sense the temperature of the lens array apparatus, and the voltage controller is arranged to adjust the voltage applied in the first and second mode to compensate for variations in the temperature of the lens array apparatus in response to the temperature sensed by the temperature sensor.

This type of apparatus has the advantage of providing automatic compensation for temperature changes.

In another type of apparatus, an input device allows a user to input a voltage adjustment, and the voltage controller being arranged to adjust the voltage applied in the first and second mode in response to the voltage adjustment input to the input device.

This type of apparatus has the advantage of simplicity.

Advantageously, the refractive index of the isotropic material is between the ordinary refractive index of the birefringent material and the extraordinary refractive index of the birefringent material at temperatures below a limit of at least 25° C.

As compared to the typical situation that the refractive index of the isotropic material is equal the ordinary refractive index of the birefringent material (or in other material systems, the extraordinary refractive index of the birefringent material) at the typical design temperature of 20° C., the range of temperatures where the refractive index of the isotropic material is above the ordinary refractive index of the birefringent material (or below the extraordinary refractive index of the birefringent material) is increased. However, in this range the voltage controller can compensate for the variations with temperature by adjusting the effective refractive index of the birefringent material, so this feature effectively increases the operating temperature range. The limit may be greater than 25° C. to further increase the range.

Advantageously, the active birefringent lens array apparatus is used in display apparatus further comprising a spatial light modulator arranged in series with the active birefringent lens array apparatus, wherein, at temperatures below a limit of at least 25° C., the power of the array of lenses in the first mode is greater than the power required for the array of lenses to provide the best focus of the spatial light modulator.

As compared to the typical situation that the power of the array of lenses in the first mode is designed to provide best focus at the typical design temperature of 20° C., the range of temperatures where power of the array of lenses in the first mode is too strong for best focus is increased. However, in this range, the voltage controller can reduce the power to adjust the focus of the lens array towards best focus by adjusting the effective refractive index of the birefringent material, so this feature effectively increases the operating temperature range. The limit may be greater than 25° C. to further increase the range.

In another form of a fifth aspect of the present invention, there is provided active birefringent lens array apparatus for a display apparatus comprising:

a birefringent material and a substantially isotropic material having relief surface therebetween defining an array of lenses;

electrodes for applying a control voltage across the birefringent material for electrically switching the birefringent material between a first mode and a second mode, the lens array being arranged in said first mode to modify the directional distribution of incident light polarised in a predetermined direction and in said second mode to have substantially no effect on incident light polarised in said predetermined direction, wherein the refractive index of the isotropic material is equal to one of the ordinary refractive index of the birefringent material or the extraordinary refractive index of the birefringent material at a temperature above 20° C. or at a temperature at or above 25° C.

20° C. is a typical room temperature which is commonly used as a design temperature for a display apparatus. Depending on the materials, the refractive index of the isotropic material is substantially equal to one of the ordinary refractive index of the birefringent material or the extraordinary refractive index of the birefringent material. The temperature at which the refractive index of the isotropic material is exactly equal to that one of the refractive indices of the birefringent material can be selected as a design parameter by choice of the materials. In this form of a fifth aspect of the present invention, that temperature is not the normal design temperature of 20° C. but is higher, typically being at a temperature at or above 25° C. Such a choice is based on an appreciation that display apparatuses are used more often at temperatures above the normal design temperature of 20° C. Therefore raising the temperature at which the refractive index of the isotropic material is exactly equal to the relevant one of the refractive indices of the birefringent material actually causes the refractive index of the isotropic material to be closer to the relevant one of the refractive indices of the birefringent material over a greater proportion of the typical use of a display apparatus.

With currently preferred materials, the refractive index of the isotropic material is substantially equal to the ordinary refractive index of the birefringent material, and exactly equal at a temperature above 20° C., but with other materials the refractive index of the isotropic material may be substantially equal to the extraordinary refractive index of the birefringent material, and exactly equal at a temperature above 20° C.

Any or all of the various aspects of the invention may advantageously be used in combination. Therefore, in general, any of features of any of the aspects of the invention may be applied to any of the other aspects of the invention.

In all the aspects of the present invention, the following comments apply. The lens array may be used with any type of display apparatus producing a substantially linearly polarised output, for example a transmissive spatial light modulator lit by a backlight having a polariser to polarise the output; or an emissive spatial light modulator which may be intrinsically unpolarised and provided with a polariser or may be polarised. In general, the display device may employ any type of spatial light modulator to modulate the light of each pixel, including transmissive, emissive or reflective, or even a combination thereof.

The lens array is arranged in said first mode to modify the directional distribution of incident light. This may be used to achieve a variety of different effects including, but not limited to, the provision of: a 3D autostereoscopic effect; regions of high brightness; or a multi-user display system.

Thus such devices can be used for:

an autostereoscopic display means which can conveniently provide a moving full colour 3D stereoscopic image which may be viewed by the unaided eye in one mode of operation and a full resolution 2D image in a second mode of operation;

a switchable high brightness transflective and reflective display system which in a first mode may exhibit substantially non-directional brightness performance and in a second mode may exhibit substantially directional brightness performance; or a multi-viewer display means which can conveniently provide one moving full colour 2D images to one observer and at least a second different 2D image to at least a second observer in one mode of operation and a full resolution 2D image seen by all observers in a second mode of operation.

Embodiments of the present invention can provide the following advantages to provide the following advantages singly or in any combination.

This invention enables the generation of autostereoscopic 3D images and full resolution 2D images of high quality with low levels of image cross talk and high brightness.

This invention also enables the generation of a directional multi-viewer display that can be switched between a 2D mode and a mode in which images (which may be different) can be seen by different viewers from a wide range of directions.

By arranging the microlenses to be internal to the glass substrate, reflections from the surfaces of the lenses can be minimised and the output surface (which may be planar) can be anti-reflection coated.

A high brightness transflective or reflective display advantageously has a first mode with substantially non-directional properties as defined by the reflector material of the display and in a second mode has directional brightness property such that the display brightness is greater from a defined range of angles. Such a display works in full colour and can be used to increase the brightness of both reflective and transmissive modes of operation.

A multi-viewer display can be configured so that in one mode of operation all viewers can see the same image and in a second mode of operation different viewers can see different images to allow multiple simultaneous uses of the display.

This can reduce the number of displays and display drivers required in an environment by allowing each observer to see their preferred choice of image from the same display unit.

Such a display may be particularly suitable for systems such as automobile displays, automatic teller machines and seat-back aviation entertainment displays.

BRIEF DESCRIPTION OF THE DRAWINGS

Embodiments of the present invention will now be described, by way of example only, with reference to the accompanying drawings, in which:

FIG. 7b shows the two cylindrical lenses of FIG. 7a in a second cross section perpendicular to that of FIG. 7a;

FIG. 9b shows the two cylindrical lenses of FIG. 9a in a second cross section perpendicular to that of FIG. 9a;

FIG. 11b shows the two cylindrical lenses of FIG. 11a in a second cross section perpendicular to that of FIG. 11a;

FIG. 13b shows the two cylindrical lenses of FIG. 13a in a second cross section perpendicular to that of FIG. 13a;

Figure 1A:
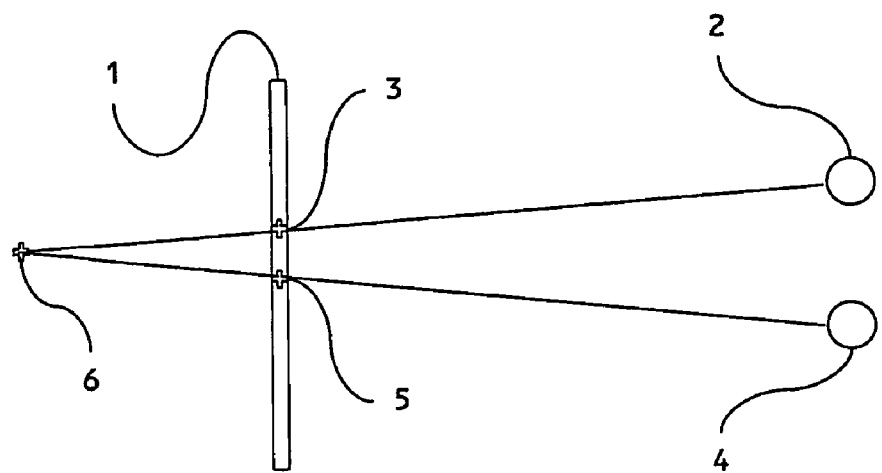
FIG. 1a shows the generation of apparent depth in a 3D display for an object behind the screen plane.
Figure 1B:
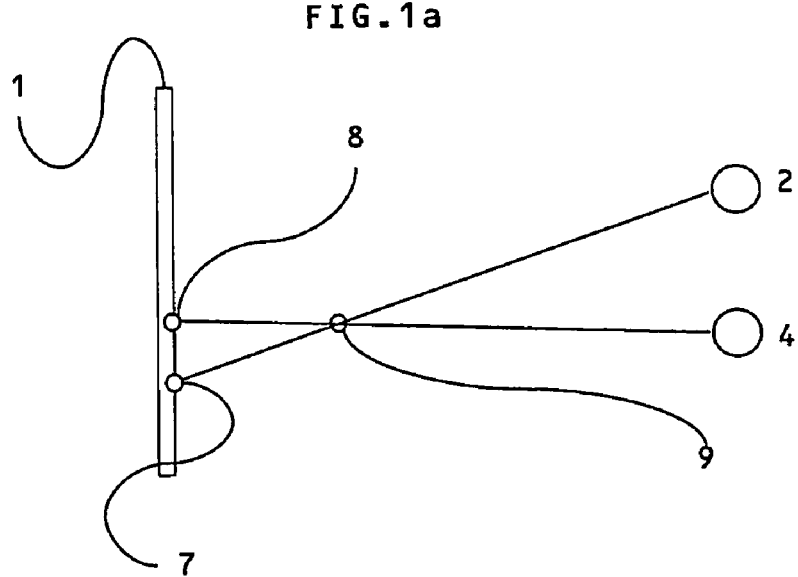
FIG. 1b shows the generation of apparent depth in a 3D display for an object in front of the screen plane.
Figure 1C:
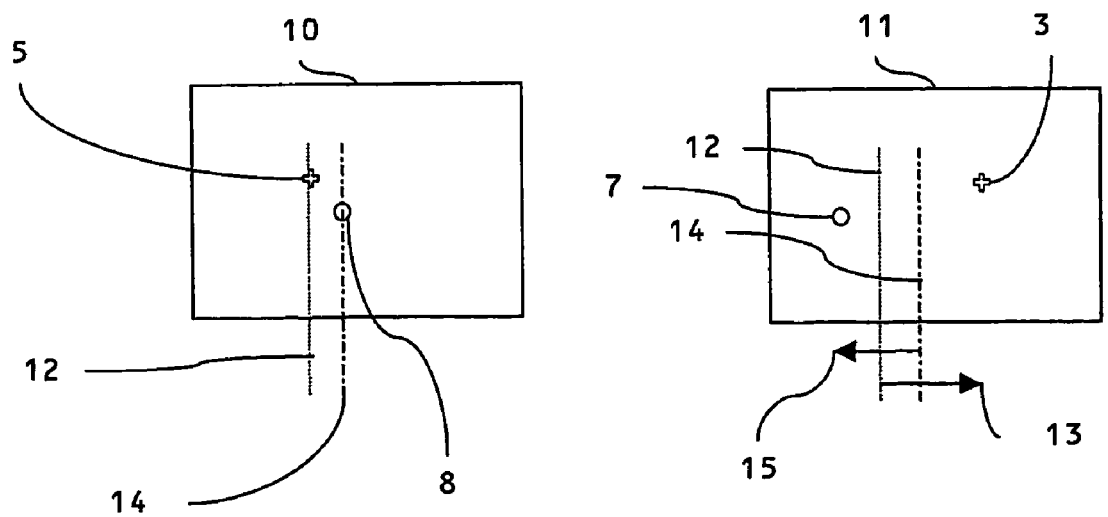
FIG. 1c shows the position of the corresponding homologous points on each image of a stereo pair of images.
Figure 2A:
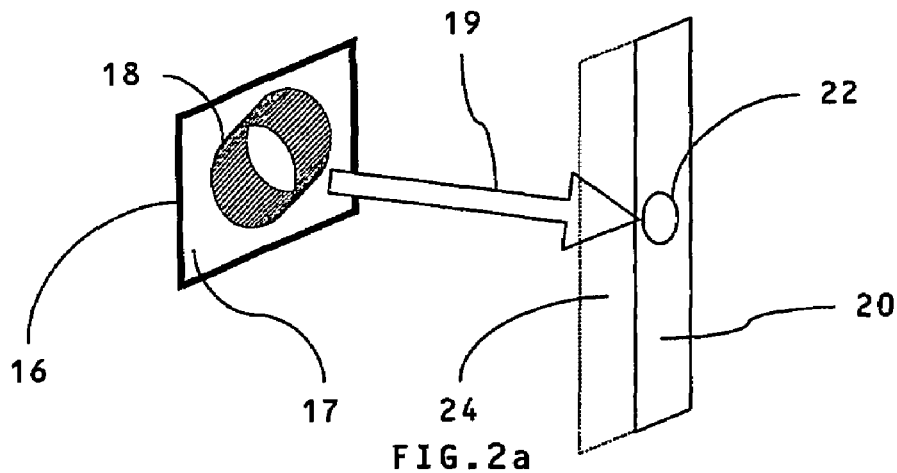
FIG. 2a shows schematically the formation of the right eye viewing window in front of an autostereoscopic 3D display.
Figure 2B:
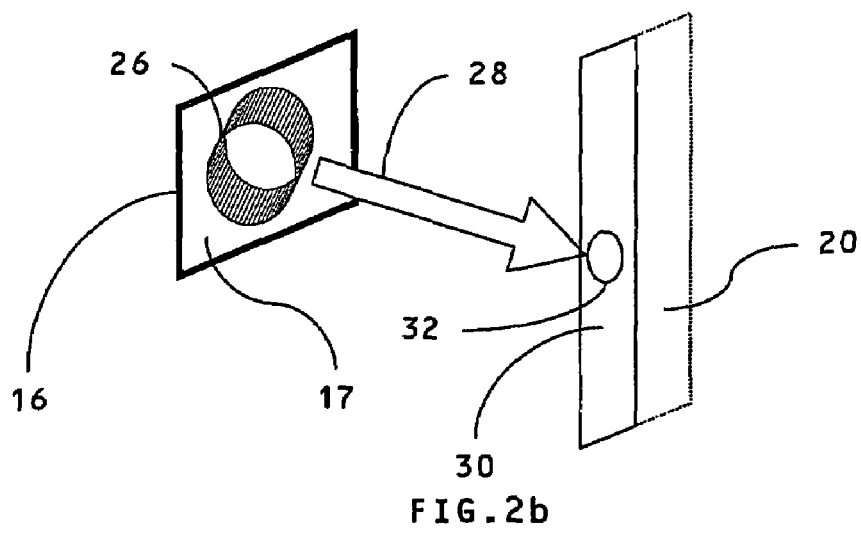
FIG. 2b shows schematically the formation of the left eye viewing window in front of an autostereoscopic 3D display.
Figure 3:
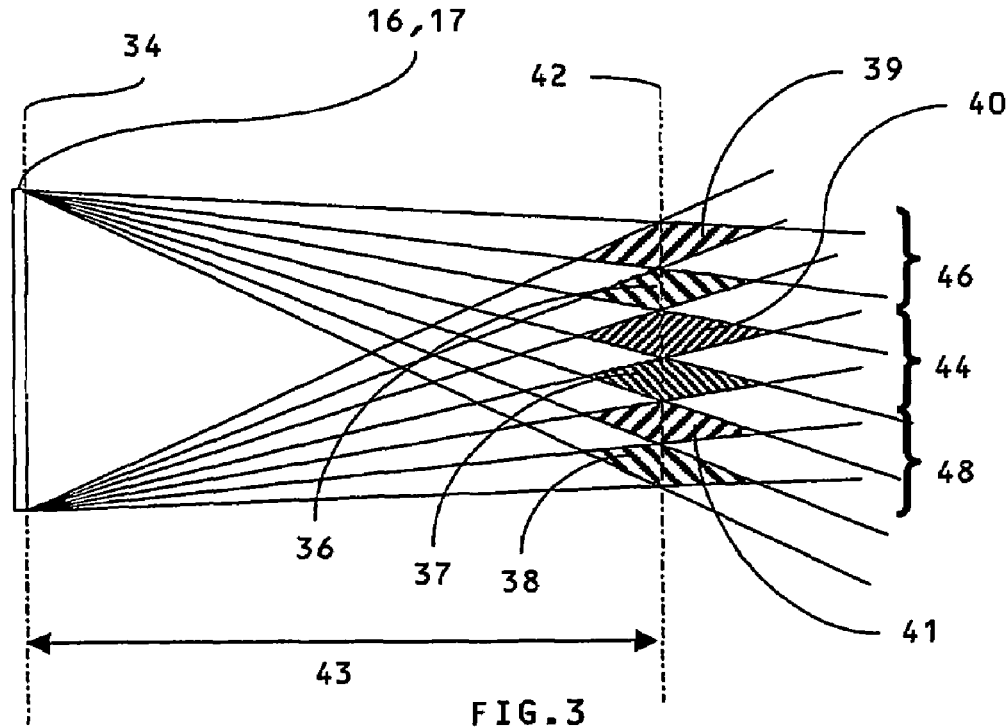
FIG. 3 shows in plan view the generation of viewing zones from the output cones of a 3D display.
Figure 4A:
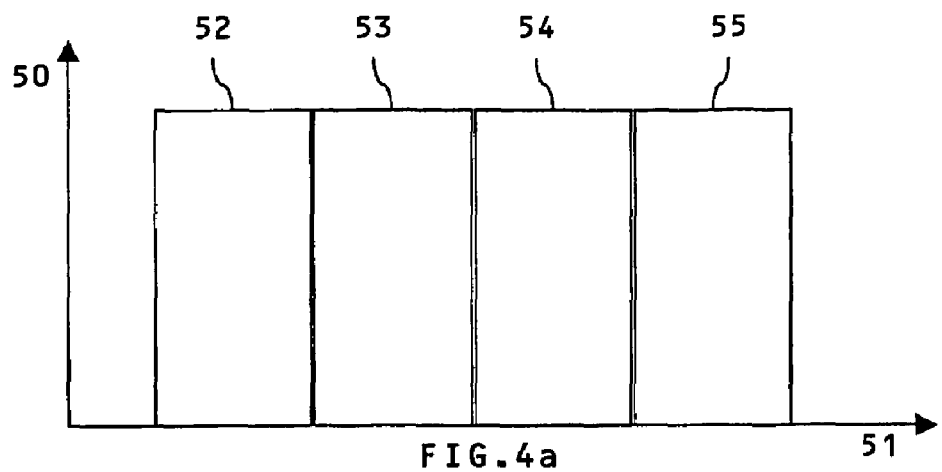
FIG. 4a shows the ideal window profile for an autostereoscopic display.
Figure 4B:
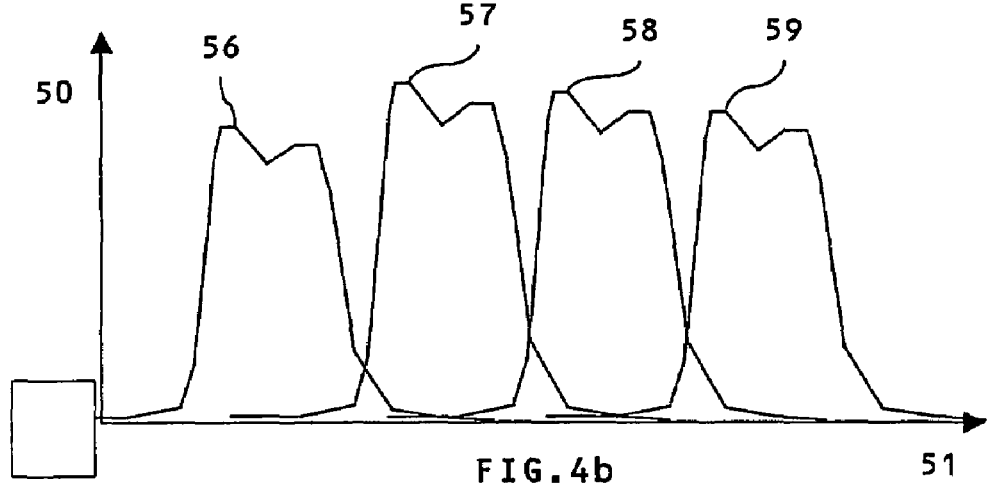
FIG. 4b shows a schematic of the output profile of viewing windows from an autostereoscopic 3D display.
Figure 5:
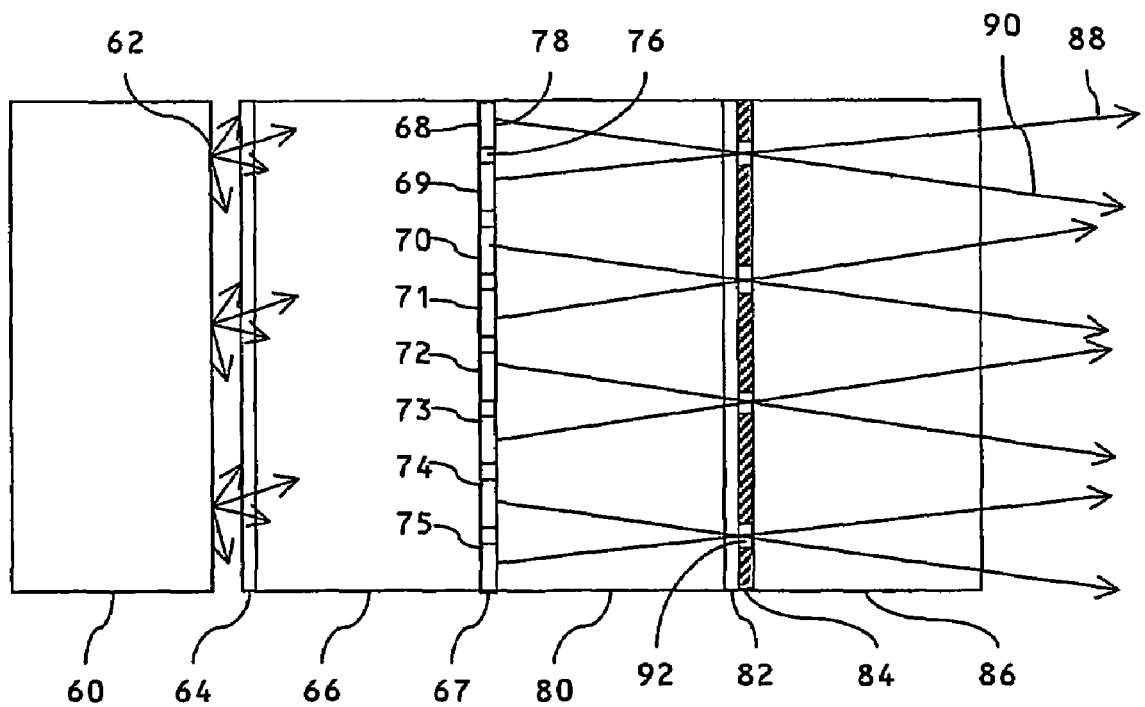
FIG. 5 shows the structure of a parallax barrier display.

Some of the various embodiments employ common elements which, for brevity, will be given common reference numerals and a description thereof will not be repeated. Furthermore the description of the elements of each embodiment applies equally to the identical elements of the other embodiments and the elements having corresponding effects, mutatis mutandis. Also, the figures illustrating the embodiments which are displays show only a portion of display, for clarity. In fact, the construction is repeated over the entire area of the display.

In this specification, the direction of the optical axis of the birefringent material (the director direction, or the extraordinary axis direction) will be referred to as the birefringent optical axis. This should not be confused with the optical axis of the lenses which is defined in the usual way by geometric optics.

A cylindrical lens describes a lens in which an edge (which has a radius of curvature and may have other aspheric components) is swept in a first linear direction The geometric microlens axis is defined as the line along the centre of the lens in the first linear direction, i.e. parallel to the direction of sweep of the edge. In a 2D-3D type display, the geometric microlens axis is vertical, so that it is parallel to the columns of pixels of the display. In a brightness enhanced display as described herein, the geometric microlens axis is horizontal so that it is parallel to the rows of the pixels of the display.

In all uses, when reference is made to material being aligned in a particular direction, there may be a pretilt to prevent degeneracy in the cell, in which case there remains substantial alignment, although not perfect alignment.

In this document, an SLM (spatial light modulator) includes both 'light valve' devices such as liquid crystal displays and emissive devices such as electroluminescent displays and LED displays. In the various display apparatuses, the pitch of the lenses corresponds to the viewpoint correction condition, that is the pitch of the parallax barrier is slightly smaller than twice the pitch of the pixel array in order to steer the light from each pixel to the viewing window.

In the following embodiments, polymer material is used as an isotropic material, but in principle materials other than polymers could alternatively be used, for example glass, in which case a relief surface may be formed by etching.

Zero Twist Active Lenses

Figure 6:
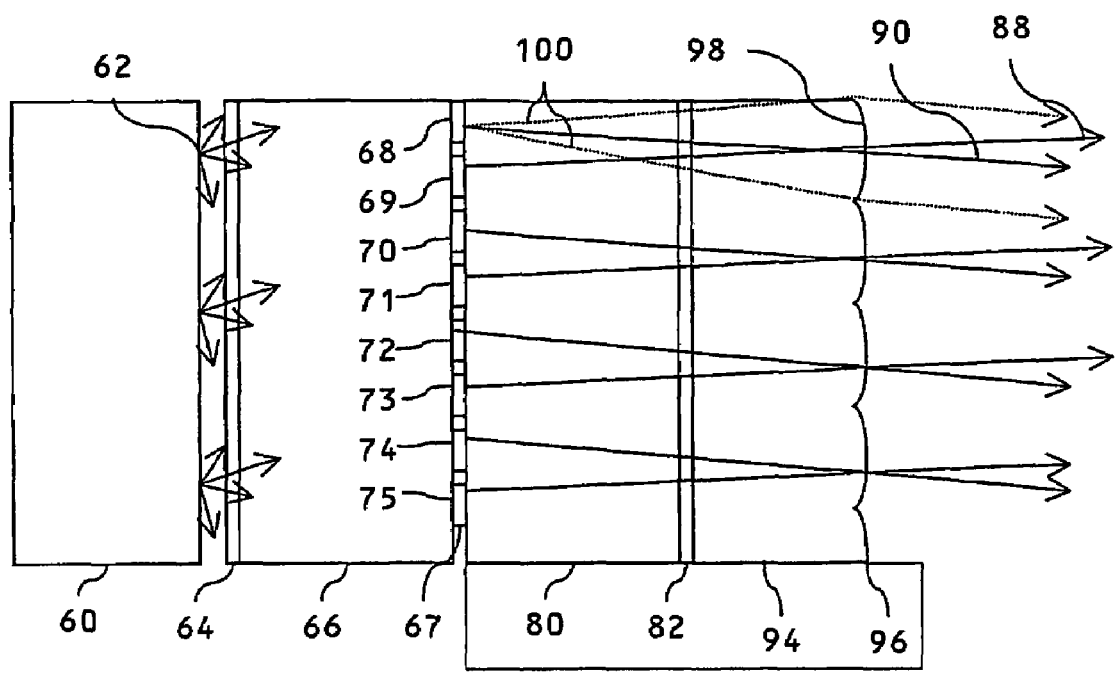
FIG. 6 shows the structure of a lenticular screen display.

An active lens is a lens comprising a switchable birefringent material which allows switching between respective directional distributions. The fixed lens 94,98 of FIG. 6 may be replaced by an active lens of the present invention to advantageously allow switching between for example a full resolution 2D mode and an autostereoscopic 3D mode.

Figure 7A:
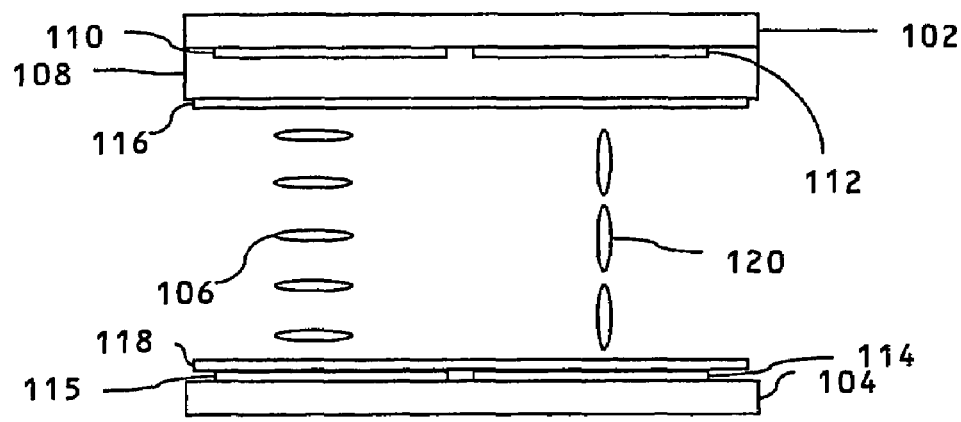
FIG. 7a shows in a first cross section two cylindrical lenses of a lens array in which the liquid crystal alignment is homogeneous at both surfaces of a lens.
Figure 7B:
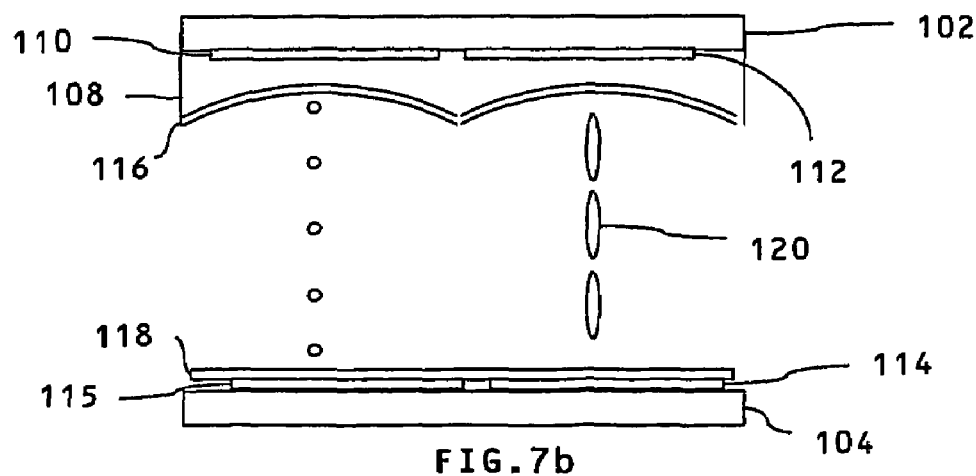

FIGS. 7a and 7b show respective side views of one type of switchable birefringent lens array, termed an active lens. The lens form comprises an array of elongate cylindrical lenses. For clarity FIGS. 7a and 7b both illustrate a first cylindrical lens, between electrodes 110 and 115, having no control voltage applied across the electrodes 110 and 115 and a second cylindrical lens, between electrodes 112 and 114 having a control voltage applied across the electrodes 112 and 114. A first substrate 102 and a second substrate 104 have a birefringent material 106 sandwiched between them. The first substrate 102 has the surface relief structure 108 formed on it. The structure 108 may be comprised of a substantially isotropic material. Thus the birefringent material 106 has a relief surface adjacent the first substrate 102 and the structure 108 and has a planar surface adjacent the second substrate 104.

Electrode layers 110 and 112 are formed on the substrate 102, and electrode layers 114, 115 are formed on the substrate 104. The electrodes may for example be transparent electrodes such as Indium Tin Oxide (ITO). The electrodes 110 and 112 may alternatively be formed on the surface of the lens structure 108.

The electrodes 110, 112 and 114,115 are shown as separate elements for purposes of explanation of the effect so that the liquid crystal switching is shown for different electric fields in different parts of the same image. In practical devices, the electrodes on both substrates may be segmented so that different regions of the lens area can be controlled independently to be 2D or 3D, or they may be a single element over the whole display area Specifically the lens array may be passive multiplexed addressed as is known in the art.

The lenses may be spaced from the second substrate 104 by means of spacer balls, spacer fibres, spacer ribs or other known spacer techniques. Alternatively, the lens may touch down on to the planar surface. Advantageously, this removes the need for spacers, but will reduce the active aperture of the lens.

In the gap between the electrodes 110 and 115, the birefringent molecules are represented by a positive dielectric anisotropy, nematic liquid crystal material with no electric field applied across the cell. The director of the liquid crystal molecules is aligned substantially in the plane of the surface by means of homogeneous alignment layers 116 and 118 at the surface relief structure 108 and second substrate 104. A small pretilt (not shown) may be imposed on the cell by the alignment layers 116,118. The molecules are represented as elongate ellipses for the purpose of explanation, with the extraordinary refractive index parallel to the long axis of the molecule.

In the switched state, the electric field serves to reorient the liquid crystal molecules so that the director orientation 120 in the middle of the lens cell is substantially vertical. This causes a variation in the refractive index profile through the cell.

Figure 8A:
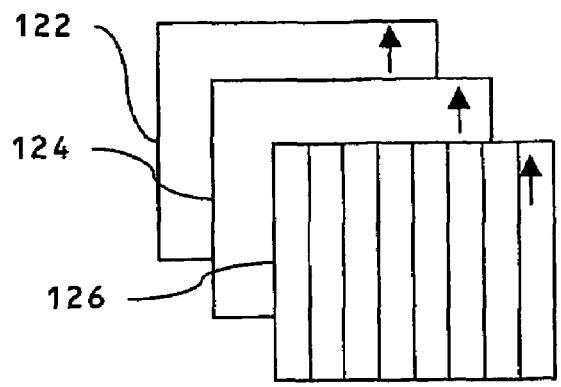
FIG. 8a shows the alignment and polarisation directions for an active lens autostereoscopic 3D display.

In operation, such an element is aligned for example on the output polariser of a Thin Film Transistor (TFT) LCD, as shown in FIG. 8a. If the transmission direction 122 of the linear output polarisation of the display is 0 degrees, then the light is incident on a first plane substrate 124 which comprises the layers 104,114,115 and 118 of the second substrate. The alignment direction of the liquid crystal material at this substrate parallel to the transmission axis of the polariser 122. The light passes through the birefringent material and encounters the lens substrate 126 comprising the surfaces 102,108,110,116.

In the OFF state, no voltage is applied to the cell, and the polarisation is incident on the extraordinary axis of the liquid crystal material. The refractive index of the polymer is set to be close to the ordinary refractive index of the liquid crystal material, and thus there is a phase difference at the surface of the lens. The lens acts on the light in the vertical polarisation to cause a change in the directional distribution of the optical output. The phase structure can be set so that the lens has a focal length such that a pixel plane is substantially imaged to a window plane as well known for autostereoscopic 3D displays and directional viewing systems.

Figure 8B:
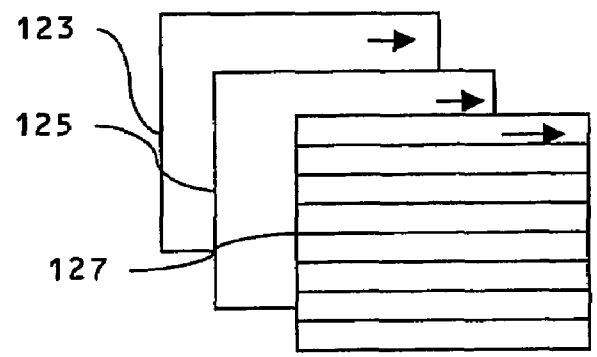
FIG. 8b shows the alignment and polarisation directions for an active lens brightness enhancing display.

In enhanced brightness viewing systems, an image of the pixel plane is produced at a window plane for horizontally aligned cylindrical microlens arrays 127 rather than vertically aligned lenses. In this case, the alignment direction of the output polariser 123 is set to be horizontal as shown in FIG. 8b and the alignment direction at the plan 125e and surface relief structures 127 are also set to be horizontal. In the following discussion, it will be assumed that the lenses are aligned vertically, but the same apparatus can be applied to horizontally aligned lenses.

In the ON state, a voltage is applied across the cell and the liquid crystal material realigns parallel to the electric field, to orientation 120 shown in FIGS. 7a and 7b so that the incident polarisation state sees substantially the ordinary refractive index of the liquid crystal. As the lens structure 108 is substantially indexed matched to the ordinary index of the liquid crystal material, then substantially no optical effect is observed in the liquid crystal lens. Substantially no modification of the directional distribution is imparted by the lens in this mode, and so the directionality of the output is substantially the same as the output from the base display. In practical systems, the index matching might not be exact and so, to the extent it is inexact, there may be a small residual optical effect. This mode of operation can be used for the 2D or unmodified output of the display. Advantageously, this allows a user to see all of the pixels of the display for an autostereoscopic or directional display system, or to see a uniformly illuminated window plane for an enhanced brightness display system.

Figure 7C:
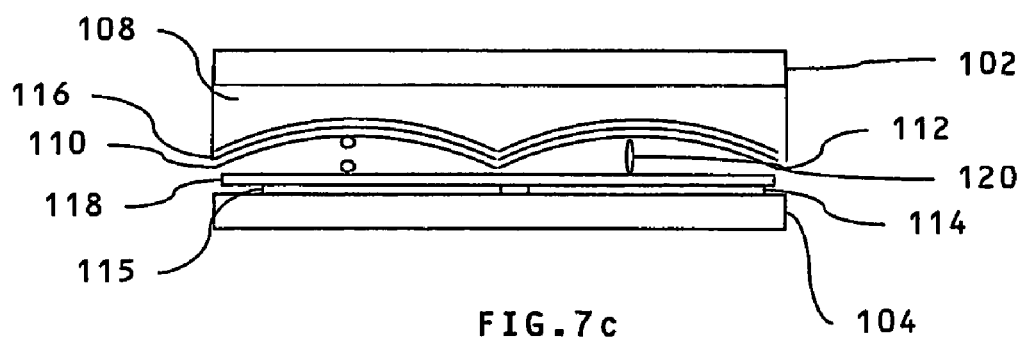
FIG. 7c shows in the same view as FIG. 7b, an alternative arrangement in which the cusps are substantially in contact with the planar surface and an electrode is formed on the surface relief surface.

FIG. 7c shows a cell in which the lens cusps are in contact with the planar substrate and the electrodes are positioned on the surface relief structure. Additional insulating layers (not shown) may be incorporated on the surfaces to prevent electrical short circuits. In general it may be desirable to incorporate the electrodes on plane surfaces as shown in FIGS. 7a and 7b in order to remove electrical shorts, although this may increase the driving voltage across the cell.

Such a device in which the planar substrate is aligned with the output polarisation of the display advantageously operates in the same liquid crystal mode (for example normally white or normally black) for both directional distributions of operation.

The index matching condition is set so that the directional distribution of the output is substantially unmodified. In practice, there may be a small difference between the isotropic index and the index of one of the birefringent material indices. However, for small refractive index differences, the optical output may be relatively insensitive to the difference, as the size of the eye spot at the pixel plane is similar to the size of the lens. Therefore, the tolerance on the index matching condition may be relatively relaxed. For example, in one fabricated system, the material Norland NOA71 with an isotropic index at 555 nm of 1.56 was used in combination with E7 from Merck with a corresponding ordinary refractive index of 1.52. In a 2D-3D display demonstration, this led to a small variation of intensity in the window plane in the 2D mode when used, while not substantially affecting the quality of the 2D image.

Twisted Active Lens Cells

In practice, the output polarisation angle of polarised display devices is not generally set to be vertical. This is due to the optimisation of the viewing angle performance of displays such as liquid crystal displays. For example, well known normally white transmissive twisted nematic displays have output polarisations at an angle of 45 degrees, while transflective and reflective displays have output angles near to 20 degrees for example. In the embodiments described so far, the output angle of the polarisation state on the input and output surfaces of the birefringent lens are set to be zero which may not match this angle.

The surface relief structure has an associated surface alignment energy and will impart an alignment on to the liquid crystal cell in competition with the alignment layer. This effect may be particularly important near to the cusps of the lens where the radius of curvature is a minimum. This may cause disclinations in the liquid crystal material between areas of different liquid crystal director orientation. Disclinations may cause scatter, increased optical cross talk, reduction in lens contrast and increased relaxation times and are therefore undesirable. It is therefore preferable to align the liquid crystal material at the lens surface parallel to the geometric optical axis of the cylindrical lenses of the lens array.

One approach would be to produce an alignment layers on the plane and surface relief surfaces that are parallel to the panel output polarisation. This would require an alignment layer at the lens surface relief structure which is not parallel to the geometric lens axis of the cylindrical lenses.

In an embodiment of this invention, the output polarisation of the display can be modified by incorporating a waveplate such as a half waveplate at the input to the active lens. This enables the output linear polarisation state to be rotated to the vertical prior to passing through the active lens. Half waveplates and broadband half waveplates in which chromatic dispersion effects are reduced are well known in the art. The waveplate will have an additional cost due to material and fitting to the device, the waveplate may be chromatic, and the waveplate has an additional thickness. The separation of the pixel plane and the lens determines the distance of the windows from the display device, therefore increasing this distance increases the distance of the best viewing zone from the display.

For example, a two view display may have a colour sub-pixel pitch of 80 um will have lenses on a pitch of substantially 160 um and a typical separation of pixels to lenses of 900 microns comprising a 500 micron display substrate thickness, a 200 um output polariser thickness, a 150 um glass Microsheet thickness and a 50 um thick liquid crystal layer. This system will produce 65 mm width windows at a distance of 480 mm from the display. If a 200 micron thick waveplate is added then this distance will increase to 585 mm. Such an increase in nominal viewing distance is undesirable for many displays, particularly mobile displays. Reducing the pixel size will further increase the viewing distance. Thin waveplates, such as those made by coating a highly birefringent material may be used at the expense of extra processing time and materials. Therefore, introducing an additional waveplate may not be a desirable option.

It would be desirable to produce an active lens in which the alignment of the liquid crystal material in the 3D mode at the surface relief structure is parallel to the geometric lens axis, but to incorporate the polarisation rotation function in to the lens device, thus removing the need for the additional waveplate or for redesign of the display to provide a vertical output polarisation.

It is a purpose of this invention to provide adjustment of the output polarisation in an active lens by using guiding rotation within active lenses, by setting an angle between the alignment of liquid crystal material on the plane substrate and on the lens substrate in the mode in which the lens has optical power such that a twist of the incident polarisation state occurs through the thickness of the active lens. The active lens thus serves to provide a correction of the output polarisation from the display device in addition to parallel alignment of the birefringent material to the geometric optical axis of the cylindrical lenses in the directional distribution modifying mode of operation.

This is unexpectedly advantageous, as can be seen by examining an example system. In the example autostereoscopic 3D display given, using an isotropic material of refractive index 1.56 and E7 liquid crystal material from Merck Limited with an extraordinary refractive index of 1.75 gives an optimum lens radius of curvature of 130 um. Such a lens has a sag of 27.5 um. A liquid crystal layer of at least this thickness is thus required at the thickest part of the lens. Such a layer has an optical thickness of greater than 6 um and from the Gooch and Tarry relationship is thus in the strongly guided regime, approaching the Maugin limit. Therefore the polarisation state will be conveniently guided over most of the lens area.

Figure 8C:
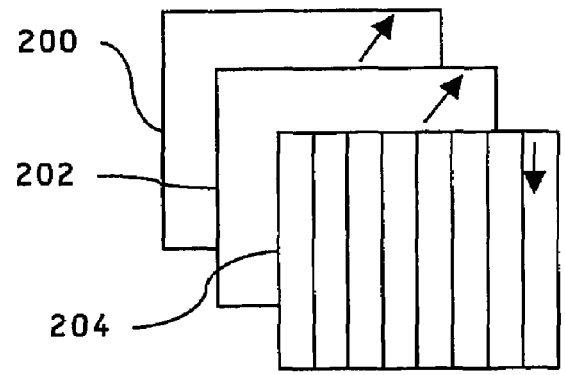
FIG. 8c shows the alignment and polarisation directions for a twisted active lens autostereoscopic 3D display.

For a positive power liquid crystal lens, the cusps may have a reduced thickness and thus guiding may be less effective. Similarly, for a negative power liquid crystal lens, the centre of the lens may have a reduced thickness and the guiding may be less effective. An additional uniform thickness layer of liquid crystal material may be incorporated near to the thinnest part of the cell so that the layer continues to guide the polarisation state and thus optimise the contrast of the device. An embodiment of the invention is shown in FIG. 8c for an autostereoscopic display using a base LCD with a 45 degree output polariser transmission angle 200. The output from the display is incident on a plane substrate with a homogeneously aligned positive dielectric anisotropy liquid crystal material on its surface. The alignment layer at the lens surface is parallel to the lenses and thus vertical. A 45 degree rotation of the polarisation state through the lens thus takes place, and the polarisation is incident on the extraordinary axis of the liquid crystal material at the lens surface, creating a phase mismatch and thus lens focal length.

The rotation of the material in the cell may be aided by doping with a cholesteric material. To compensate for pre-tilt effects near to the alignment layers, the alignment direction at the plane and surface relief surfaces may have a resolved alignment direction component in the vertical direction that is anti-parallel, so that the cell has a substantially uniform pre-tilt through the structure in the OFF state. Optionally the cell may have components of alignment in the vertical direction which are parallel or anti-parallel in which case the response speed may be improved.

In the ON state, the molecules are substantially driven in to the vertical alignment state as shown in FIG. 7b, with molecular alignment 120 parallel to the applied field. In this case, there will be reduced rotation of polarisation in the lens so that the polarisation state incident on the lens surface is not parallel to the geometric lens axis. However, the polarisation state will be aligned to the ordinary component of the liquid crystal refractive index, and thus the lenses will be substantially index matched, and will have substantially no optical power.

In the ON state, there may be residual tilt of the liquid crystal material near the alignment layers, which will cause an increase in the focal length of the lens for the incident polarisation state. This tilt can be compensated by reducing the refractive index of the ordinary component of the liquid crystal material so that it is lower than the isotropic material. The bulk focal length of the lens can thus be compensated. The radius of curvature is set from the extraordinary index of the liquid crystal material to determine the focal length in the OFF state.

Figure 8D:
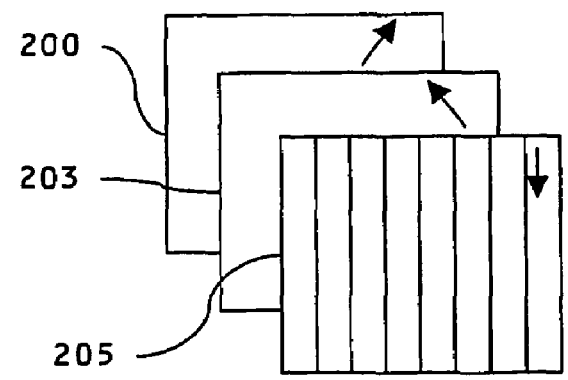
FIG. 8d shows an alternative alignment and polarisation directions for a twisted active lens autostereoscopic 3D display.

In all of the embodiments of this invention, the alignment of the alignment layer on the first substrate may be orthogonal to rather than parallel with the input polarisation state from the polarised display device. This may advantageously improve the guiding rotation of the polarisation in the active lens cell in the first mode of operation. This is illustrated in FIG. 8d in which the alignment direction at the planar substrate 203 is orthogonal to the panel output polarisation 200. The lens array has an alignment direction 205.

Figure 18:
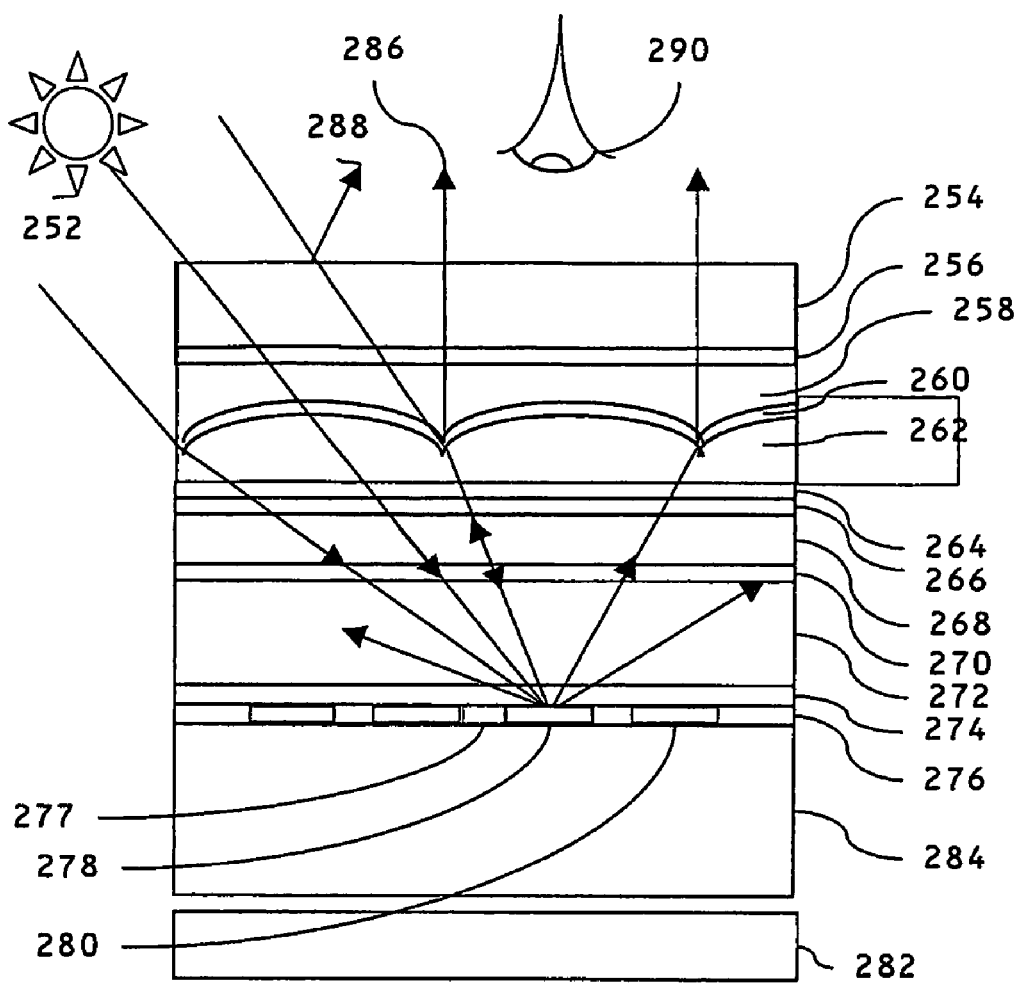
FIG. 18 shows an active lens enhanced brightness reflective display.

FIG. 18 shows another embodiment of the invention for use in an enhanced brightness transflective display mode. A light source 252 illuminates an active lens comprising a support substrate 254 with an ITO coating 256, and an isotropic microstructure 258. Alignment layers 260 are formed on the surface of the isotropic structure 258 and a liquid crystal material 262 is sandwiched between the alignment layer 260 and a planar substrate 268 with ITO coating 266 and alignment layer 264 formed on its surface. The substrate 266 may be Microsheet of thickness 160 microns for example. The active lens is placed on a polariser and waveplate stack 270 as used in a standard transflective display. The counter substrate 272 and liquid crystal layer 274 are formed on a transflective reflective pixel plane 276 with absorbing regions 277, reflective regions 278 to reflect incident light and transmissive regions 280 to transmit light from a backlight 282 and an active matrix backplane 284.

Figure 19:
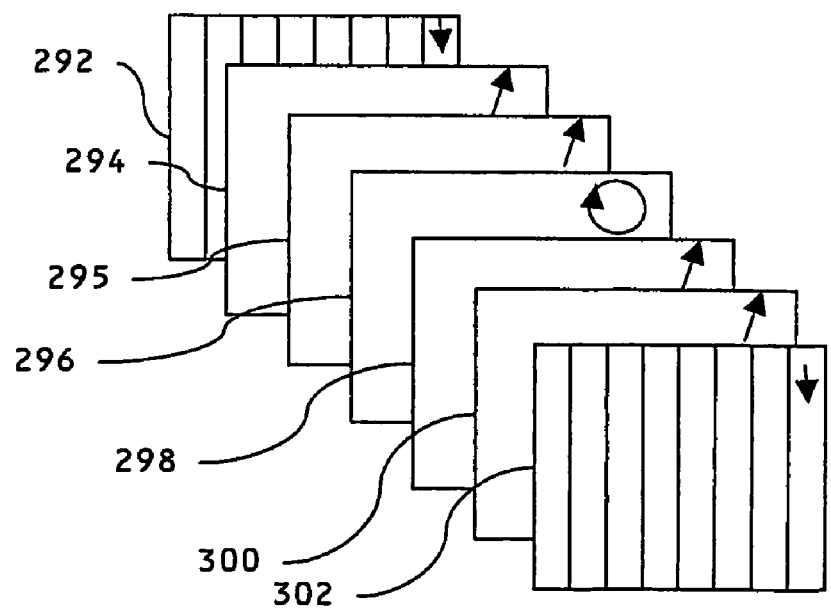
FIG. 19 shows the alignment and polarisation directions for an active lens enhanced brightness reflective display.

Light from the ambient light source 252 (not part of the apparatus) illuminates the display. In a first mode of operation, the lenses are in the OFF state so that there is a focussing function. The light source is thus focussed on to the pixel plane 276. The reflected light is collected by an adjacent lens where it is focussed to an observer as shown by the rays 286. In limited windows in front of the display, the image will appear brighter. The overall brightness is conserved, as the bright windows are interspersed by darker windows. In transmissive mode, light from the limited regions of transmission are likewise focussed to a window plane to increase the apparent brightness of the image. Frontal reflections 288 are in a different direction to the useful light 286 and are therefore not seen The operation of the display of FIG. 18 is shown in FIG. 19. The incident light is resolved in to two polarisation states at the lens 262. In the OFF state, the polarisation state that is focussed by the lens is parallel to the lens geometric axis 292 and is rotated through the lens on to the planar substrate 294 such that it is incident parallel to the transmission axis of the polariser 295 of the display, which for a typical transflective display may be at 20 degrees for example. This light is transmitted on to the reflective backplane 296 where it is modulated by the display and reflected through the polariser 298 and planar substrate 300. A second rotation of the light takes place so that it is focussed towards an observer 290 by the lens 302.

In the non-lensing mode, the ON state liquid crystal alignment is such that the incident polarisation sees the ordinary liquid crystal index in all polarisations, so the lens has effectively no function and the optical output is substantially unmodified.

A further advantage of the use of non-zero twist in the active lens device is that the alignment degeneracy of the cell can be reduced. Degeneracy arises from multiple minimum energy twist directions of the liquid crystal in the cell for liquid crystal alignment between the upper and lower surfaces. If there are multiple rotation energy minima, then there are multiple rotation paths the molecules can follow through the cell, and therefore the guiding effects can be different, giving different lens properties in different parts of the cell. Using a rotation offset allows a single preferred rotation path for the molecules in the cell, and thus increases cell uniformity.

In this way, a rotation of the polarisation state in the active lens serves to optimise the lens performance for the particular panel while maintaining parallel alignment at the lens surface. The device works in the same way for the transmitted light as the reflected path of the reflected light.

Figure 20:
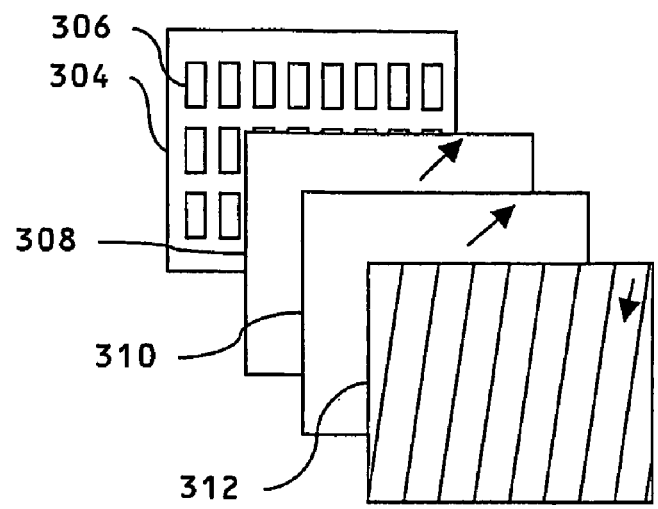
FIG. 20 shows the alignment and polarisation directions for an active lens with tilted geometric lens axis.

In a further embodiment, shown in FIG. 20, the cylindrical lens array may be tilted with respect to the columns of pixels of the panel. Tilting the lens axis with respect to the pixels of the panel is well known in the art in order to increase the apparent number of views, with the penalty of increased cross talk between the views. In the present invention, it is desirable for the active lens to have an alignment of liquid crystal at the lens surface which is parallel to the geometric lens axis. Such a device may advantageously use twist between the planar and surface relief surface in order to achieve the twist. FIG. 20 shows a pixel plane 304 in which the pixels 306 are arranged in columns and rows. The pixels are incorporated in a transmissive normally white twisted nematic liquid crystal display with a 45 degree output polarisation 308. A planar substrate 310 of an active lens has an alignment direction at 45 degrees, and a surface relief lens 312 has an alignment of geometric lens axis at 10 degrees for example. The alignment layer direction on this surface 312 is set at 190 degrees so that the alignment directions on the planar substrate have antiparallel components in the vertical direction.

The lenses may alternatively be oriented with a the opposite curvature at the surface relief plane to that shown in the figures. In this case, the thinnest part of the liquid crystal lens is aligned at the centre of the lens rather than near to the cusps. Such a lens suffers from reduced quality wavefront due to increased aberrations of the lens.

Homeotropic Alignment Layers

The embodiments described thus far use conventional homogeneous alignment layers, and positive dielectric anisotropy materials. However, in order to operate the device in 2D mode, a voltage is required to be applied across the cell. The 2D mode in many devices is likely to be used more. Operation of the device in 3D mode for 2D images will cause unwanted artefacts to users of the display and thus is undesirable. Therefore, such an element will be required to be maintained mostly in its switched state of operation. This will cause increased power consumption of the device compared to the 3D mode. If the switch fails, the device will remain in the 3D mode, which may also be undesirable.

In order for the device to operate in 2D mode when in the OFF state, the refractive index of the optical microstructure material 108 could be set to be the same as the extraordinary refractive index of the liquid crystal material. This is undesirable due to the choice of polymer and liquid crystal materials readily available at low cost and which are safe to handle.

In the above example, E7 is a typical positive dielectric anisotropy material from Merck, with extraordinary refractive index ($n_e$) of 1.75 with a delta n of 0.22 at 550 nm. Polymer materials are available with refractive indeces greater than 1.6, but these materials tend to be toxic, expensive and difficult to handle and therefore are undesirable. Alternatively, the $n_e$ of the positive dielectric anisotropy liquid crystal material can be reduced to match more acceptable polymer materials. However, reducing the $n_e$, tends to reduce the delta n of the material. For example, MLC3376 from Merck Limited has an $n_e$ of 1.57, but a delta n of only 0.09. Such a lens would require a lens curvature of less than −100 microns. Such a lens thus has an increased sag, reversed orientation, increased surface reflections and degraded aberrations leading to increased scatter, optical cross talk, and response time. Such a lens will also be less strongly guiding and so the rotation of input polarisation in the cell will be less effective.

Therefore, for many polymers typically used to form the lens structure, it is simpler, cheaper and provides higher performance to use an index match of the isotropic material to the ordinary rather than extraordinary component of the refractive index of the liquid crystal material.

Thus, active lens devices fabricated using a combination of homogeneous alignment, positive dielectric anisotropy liquid crystals and readily available polymer materials will in general require a driven 2D mode of operation which is undesirable for the reasons described above.

Figure 9A:
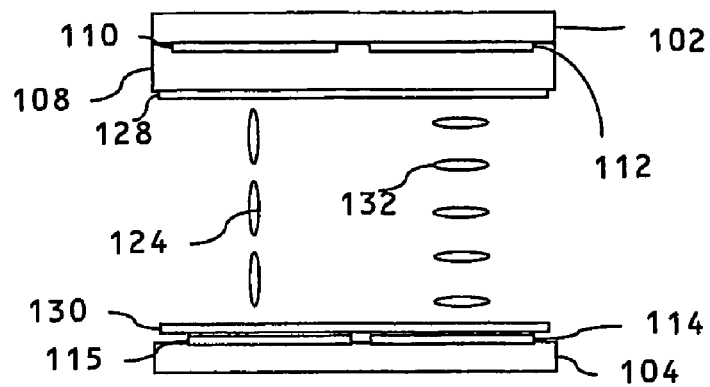
FIG. 9a shows in a first cross section two cylindrical lenses of a lens array in which the liquid crystal alignment is homeotropic at both surfaces of a lens.
Figure 9B:
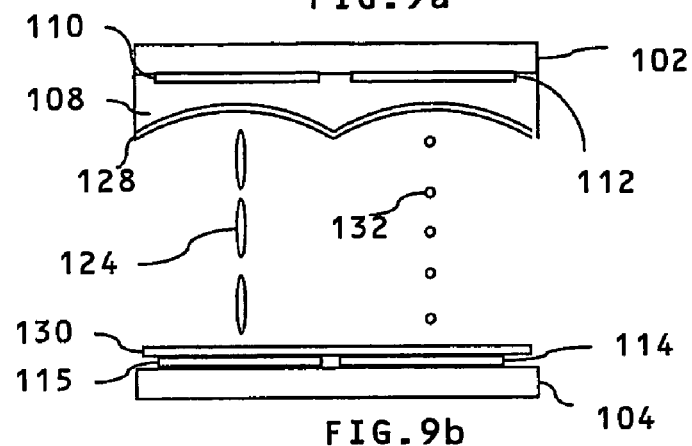

An active lens is configured as shown in FIGS. 9a and 9b which is similar to FIG. 7. The substrate 102 has electrodes 110,112, an optical microstructure 108, and a homeotropic alignment layer 128 formed on its surface, while the substrate 104 has electrodes 114,115 and homeotropic alignment layer 130 formed on its surface. The cell is filled with a liquid crystal material 132 with a negative dielectric anisotropy.

Figure 10A:
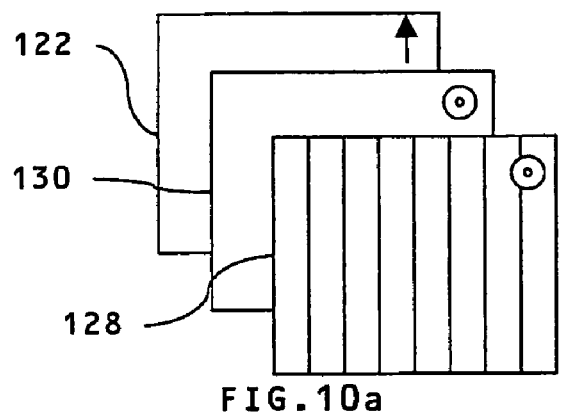
FIG. 10a shows the alignment and polarisation directions for an active lens autostereoscopic 3D display incorporating homeotropic alignment layers.

In operation of the device is described in FIG. 10a. The output polariser of the display provides an input linear polarisation state direction 136 parallel to the vertical. Homeotropic alignment causes the director to align substantially orthogonal to the plane of the surface. In the OFF state, as shown by the liquid crystal material orientation 124 under electrode 110 in FIG. 9, the polarisation state is incident on the liquid crystal material, and sees the ordinary refractive index of the liquid crystal material, which in turn is matched to the refractive index of the isotropic polymer microstructure 108. Thus, there is no substantial phase step at the lens, and the lens has substantially no effect on the output directional distribution.

In the ON state, as shown under the electrode 112 in FIGS. 9a and 9b, the negative dielectric anisotropy of the liquid crystal causes its orientation 132 to be modulated so that the director in the middle of the cell is substantially in the plane of the substrates. There is therefore a component of the extraordinary index of the liquid crystal seen by the output polarisation of the display, and a phase step is produced at by the lens. Such a lens can be used to alter the directional distribution of the display and create for example a 3D mode of operation.

Such an embodiment advantageously serves to create an unswitched 2D mode of operation using conventional lower index polymer materials and is thus cheaper and simpler to manufacture. In this embodiment, the power consumption of the device is only present when the device is in the 3D mode of operation.

In the ON state, the liquid crystal molecules are pulled parallel to the substrates by the electric field. The bias of the alignment of the liquid crystal material at the lens surface may be made parallel to the geometric microlens axis for example by the surface energy of the lens microstructure. Additional alignment features may be incorporated on this surface so as to promote alignment in this orientation in the driven state. Such alignment features may be grooves running parallel to the geometric microlens axis formed in the polymer microstructure. Such grooves may be formed by diffraction gratings for example. The diffraction gratings may be formed in the mastering process of the microlens structure, so that they advantageously can be formed in the same replication process as the lenses.

Figure 10B:
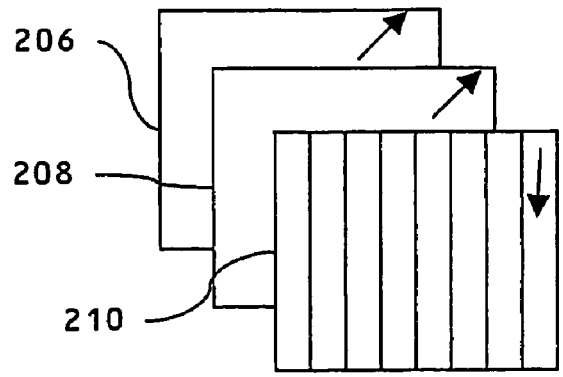
FIG. 10b shows the alignment and polarisation directions for an active lens autostereoscopic 3D display incorporating homeotropic and homogeneous alignment layers.

The planar substrate may also have a homogeneous alignment structure to bias the orientation of the molecules in the ON state. The bias of the alignment layer in the ON state may be arranged to provide rotation of the polarisation through the cell so that the output polarisation state from the display device is rotated to be substantially parallel to the geometric microlens axis. This is illustrated in FIG. 10b. A panel output polarisation of 45 degrees for example is incident on the plane substrate. In the OFF state, a homeotropically aligned liquid crystal is seen with ordinary refractive index matched to the isotropic material and thus substantially no rotation is required. In the ON state, though, the alignment layer 208 has a homogeneous alignment bias so that the liquid crystal molecules are aligned substantially parallel (or orthogonal) to the output polarisation direction of the panel. At the lenses, the homogeneous alignment bias is anti-parallel to the vertical component of the alignment at the plane substrate and thus a rotation is provided through the cell. Such a rotation provides the same advantages as described above, in particular allowing the alignment of the lenses with the output polarisation of a standard display without the requirement for additional waveplates or other modification of the display device output polarisation, thus maximising the viewing angle of the device.

Figure 11A:
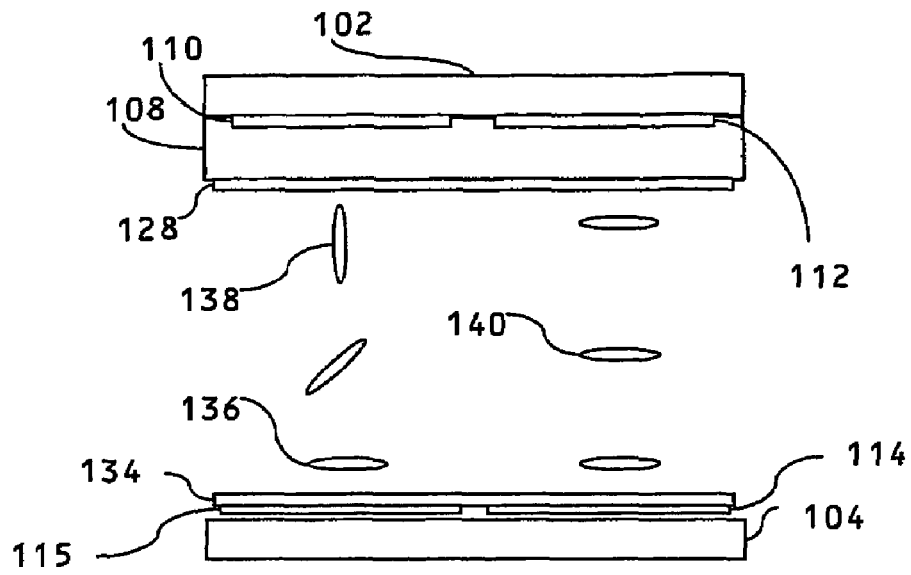
FIG. 11a shows in a first cross section two cylindrical lenses of a lens array in which the liquid crystal alignment is homeotropic at one surface and homogeneous at a second surface of an active lens.
Figure 11B:
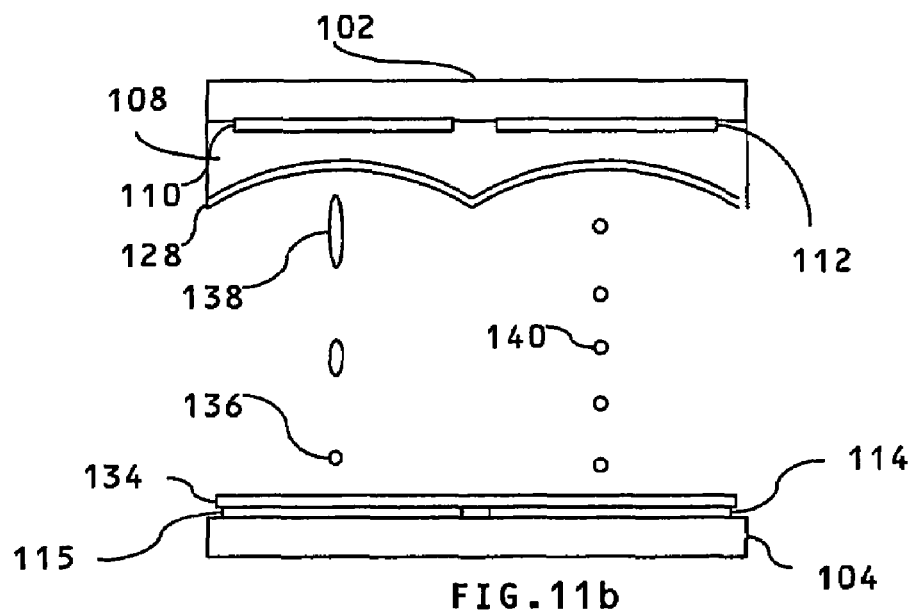
Figure 12:
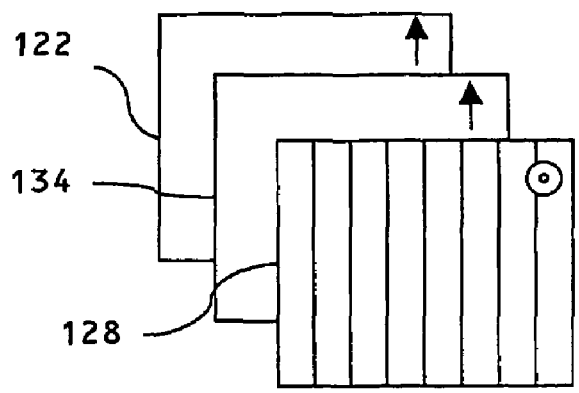
FIG. 12 shows the alignment and polarisation directions for an active lens autostereoscopic 3D display incorporating homeotropic and homogeneous alignment layers.

A further embodiment of the invention is shown in FIGS. 11 and 12. In this configuration, the alignment layer 134 at the planar substrate is a homogeneous alignment layer, causing the liquid crystal to orient parallel to the substrate. In the OFF state, the incident polarisation sees the extraordinary index in the material 136 close to the plane substrate. However, the material 138 close to the lens surface is oriented homeotropically, so that the polarisation state sees substantially the ordinary index in the surface relief region. As the polymer refractive index is substantially matched to the ordinary refractive index of the liquid crystal material, substantially no phase step is present and the lens has no function.

To compensate for the additional power of the lens in the region near the homogeneous alignment layer, the ordinary refractive index of the liquid crystal may be lower than the index of the polymer material. The curvature of the lens is set by the extraordinary index of the liquid crystal material and the polymer index.

In the ON state, the negative dielectric anisotropy material reorients so that the director 140 is substantially parallel to the substrates through the entire cell, and the polarisation state sees the extraordinary index of the liquid crystal material. A phase step at the lens is then present, giving rise to a modified directional distribution and a 3D mode of operation. This is illustrated by the director orientation 140 under electrodes 112 in FIGS. 11a and 11b.

Figure 13A:
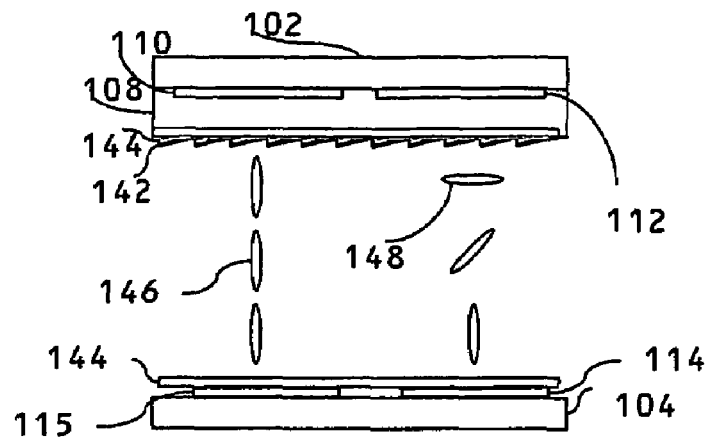
FIG. 13a shows in a first cross section two cylindrical lenses of a lens array in which the liquid crystal alignment can be homeotropic and homogeneous at a lens surface.
Figure 13B:
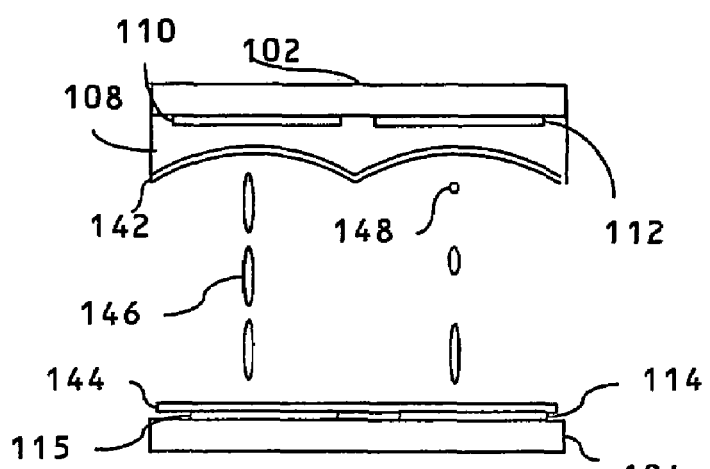

The combination of homeotropic and homogenous alignment at the respective alignment layers on the lens surface may be used to form a bistable lens as shown in FIG. 13. Such a lens does not require power to be applied other than to switch between the two states. Planar cells for pixel intensity switching applications have been described in "Grating aligned bistable Nematic device", G. P. Bryan-Brown, C. V. Brown, J. C. Jones, E. L. Wood, I. C. Sage, P. Brett, J. Rudin SID 97 Digest pp 37-40. A combination of a grating and homeotropic alignment layer are used to create a bistable cell.

In the first electrode region 110, a pulse is driven across the cell so that the material aligns in accordance with the homeotropic alignment layer across the cell. The incident linear polarisation state then sees the ordinary index of the liquid crystal material 146, and no lens structure is resolved. If a dc voltage pulse is applied then the liquid crystal alignment at the lens surface is modified so that the director 148 lies parallel to the grating surface. Thus in the region of the lens surface, the polarisation state sees the extraordinary index of the liquid crystal material and the lens is resolved. If the surface of the energy of the grating is set to be similar to the surface energy of the homeotropic alignment layer then the device may be bistable and the device will be undriven in both 2D and 3D modes. The device is switched between 2D and 3D modes by application of a positive or negative voltage pulse.

In the above embodiments a homeotropic alignment layer is used at the lens surface so that in the first undriven mode, for the incident polarisation state sees the ordinary refractive index of the liquid crystal which is index matched to the polymer. By using the ordinary refractive index, standard polymer materials may be used in device fabrication. As the phase structure is produced at the lens surface, the plane surface of the lens may use either homeotropic or homogeneous alignment.

External Polariser Active Lens Device

Figure 14:
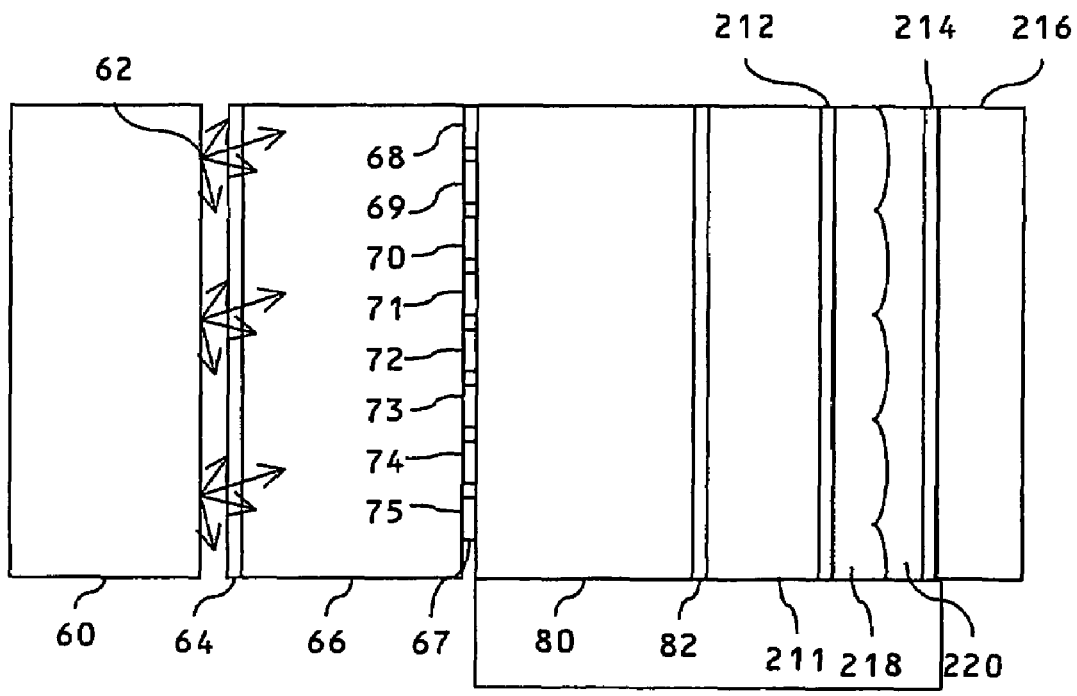
FIG. 14 shows in cross section the structure of an active lens autostereoscopic 3D display with an internal polariser.

Prior art displays do not disclose the relative position of the active lens with respect to the polariser in a polarised output display system. As shown in FIG. 14, the active lens may comprise a substrate 211, which may for example be a Microsheet glass or a plastics material substrate of thickness 150 microns or less, planar substrate alignment layer and ITO coating 212 and lens substrate alignment layer and ITO coating 214, birefringent material 218 and isotropic material 220 and final substrate 216. The structure may be placed following the output polariser of the display. The intensity has been analysed by the display polariser, and thus the lens manipulates directionality only of the output light. Such a system suffers from increase in viewing distance due to the output polariser thickness.

Figure 15:
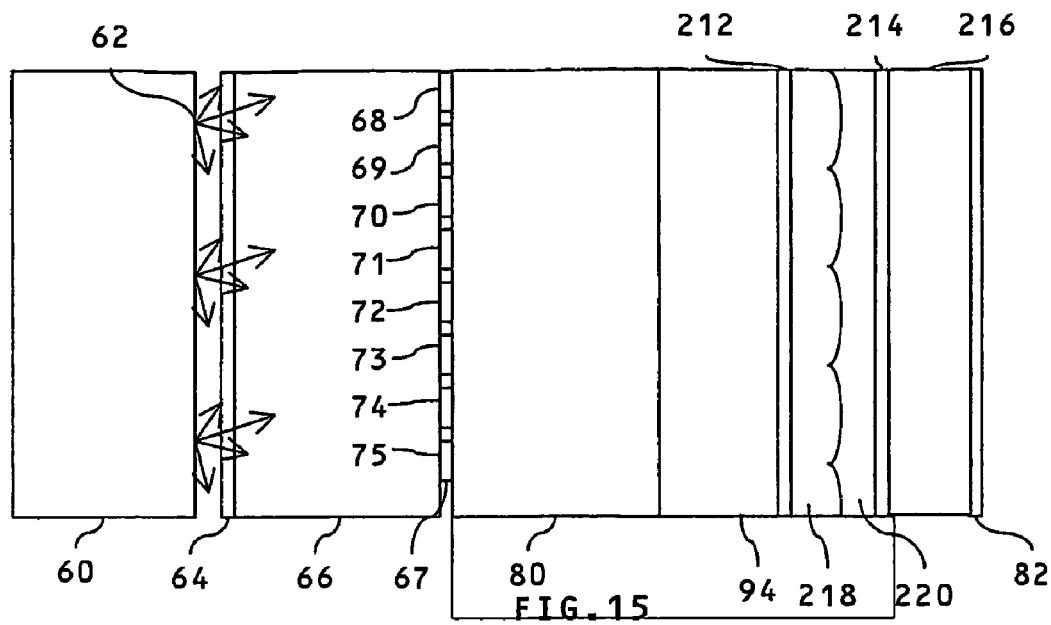
FIG. 15 shows in cross section the structure of an active lens autostereoscopic 3D display with an external polariser.
Figure 16:
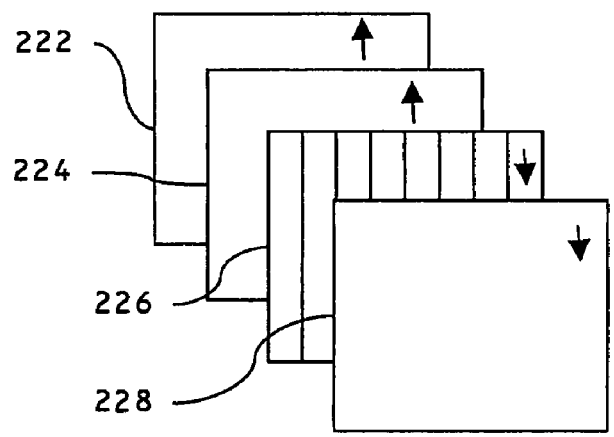
FIG. 16 shows the alignment and polarisation directions for an active lens autostereoscopic 3D display with an external polariser.

The viewing distance of the system can be reduced by positioning the polariser after the active lens of the device as shown in FIG. 15. In this case, the LCD polarisation has yet to be analysed by the output polariser 82 but passes through the active lens 211-220 first. The operation of the display is shown in FIG. 16. For example, if the display is a liquid crystal display with normally white output polarisation angle 222 set at 0 degrees, by means of an output polariser, the planar substrate has a homogeneous alignment with an alignment angle 224 of 0 degrees. In the lens OFF state, the white state light from the LCD passes through the lens so that the polarisation 226 incident on the cylindrical lens array is parallel to the geometric lens axis. This light is then transmitted through the output polariser 228 with a transmission direction at 0 degrees. In the lens ON state, an electric field is applied to the cell and the positive dielectric anisotropy material is realigned to be substantially orthogonal to the substrates of the cell. The polarisation state thus sees the ordinary refractive index of the lens and no lens function is imparted. The output polarisation state passes through the output polariser.

Such a configuration will not conveniently operate in devices with non zero degrees polarisation rotation in the lens cell due to loss of contrast at the output polariser. They may require the addition of one or more waveplates in order to rotate the output polarisation of the display. Waveplates can advantageously be made thinner than polarisers. Contrast loss in the lens cell may also serve to degrade the contrast of the final image.

The external polariser embodiment additionally has the advantage that the visibility of the lenses in external ambient light is reduced. External light sources incident on the front of the display pass through the input polariser, undergo Fresnel reflections at the lens and other surfaces with phase steps, (for example from reflective coatings such as ITO) and then pass back through the output polariser. Therefore, the external polariser absorbs a proportion of the light passing in each direction, and thus reduces lens reflections, which advantageously increases display contrast.

Advantageously, such elements can be used with liquid crystal modes with high polarisation conversion efficiency to optimise the contrast of the mode. In some devices, such as transmissive normally white twisted nematic liquid crystals, the ON state (referring to the polarisation state which produces the maximum white level) has a 90 degree rotation with respect to the black state. Thus the polarisation state passing through the lens can be resolved from just the ON state. In other devices, such as mixed twisted nematic devices for example, the ON polarisation state may not be orthogonal to the black state. Such devices may suffer from reduced contrast in the internal active lens configuration.

In systems in which waveplates are used on the optical output in addition to polarisers, such as in many reflective liquid crystal displays, the waveplates may be positioned between the pixel plane and the active lens device so that the output from the display is substantially linear.

Figure 21:
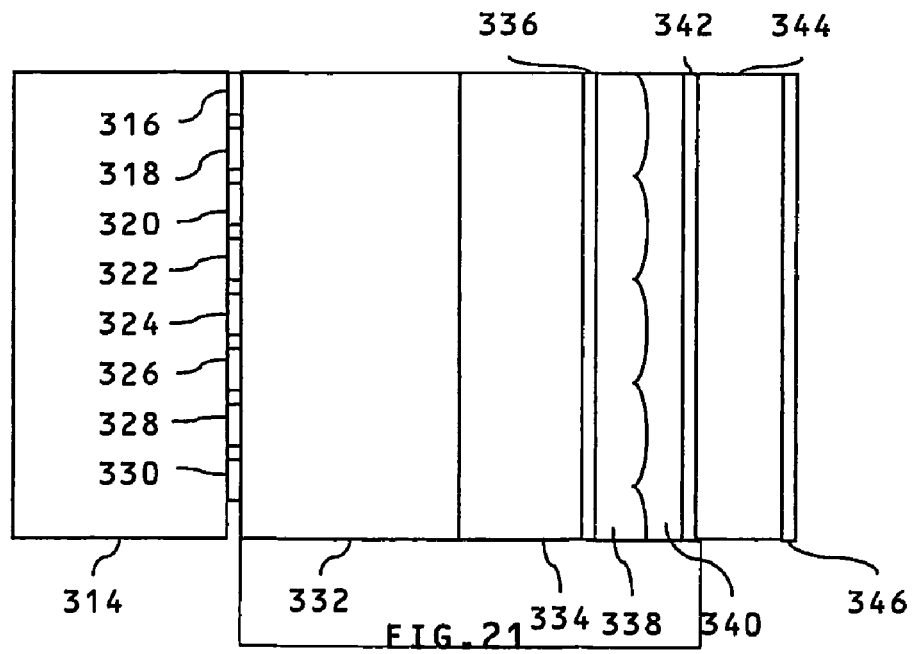
FIG. 21 shows a switchable autostereoscopic display in which an active lens is positioned between an emissive display and an output polariser.

FIG. 21 shows a further embodiment of the invention. An emissive display such as a polymer electroluminescent display for example comprises a substrate 314 on which emissive pixels 316-330 are formed. The emissive pixels may be non-polarised, partially polarised or polarised with a linear output polarisation direction which is aligned to provide optimum transmission through the remainder of the elements of the display. An emissive display counter substrate 332 has an active lens element attached. The active lens comprises for example a Microsheet 334, ITO electrodes 336,342, a switchable birefringent material 338 an isotropic surface relief structure 340, and a support substrate 344. A final output polariser 346 is attached with a transmission direction which is parallel to the geometric axis of the microlens array.

In the OFF state, the liquid crystal material receives the light from the pixels and for the vertical polarisation state (out of the plane of the paper), a phase mismatch at the refractive structure is generated, so the lens has an optical function. This polarisation state is transmitted through the output polariser 346. Thus the active lens may be positioned between the pixel plane and the output polariser, advantageously reducing the viewing distance of the display. In the ON state the molecules realign so that the output polarisation that is transmitted through the polariser 346 has seen the ordinary refractive index of the liquid crystal material 338, and no lens function is seen. In this way the polariser 344 serves to combine the functions of clean-up polariser and lens analysing polariser.

Polarised Emissive Display

Emissive displays such as inorganic and organic electroluminescent displays including polymer and small molecule organic electroluminescent displays typically produce an unpolarised optical output. However, directional distribution optical switching systems may rely on polarisation switching in order to enable a display to be reconfigured between a first mode which may be Lambertian for example, and a second mode which may be autostereoscopic 3D windows for example. Unpolarised displays will thus show a polarisation loss when combined with polarisation directional distribution optical switching systems.

It is the purpose of this invention to provide high optical efficiency in emissive displays by aligning the output polarisation of polarised emissive displays with the input polarisation state of directional distribution optical switching systems comprising active lenses. The polarisation alignment may be achieved by means of uniaxial aligned chromophores of the emissive material in the emissive pixels of the display. The alignment direction of the major axis of the polarisation output may be set to cooperate with the alignment directions of the birefringent material in a birefringent microlens.

In this way, a high efficiency emissive directional distribution optical switching display using active lenses may be achieved. Such a display has additional advantages over LCD displays, for example not requiring a backlight and thus can be made thinner and lighter which can be important for mobile applications.

Any type of polarised emissive display which provides a polarised output may be used. For example, it may be the polarised organic electroluminescent display described in "Polarized Electroluminescence from an Anisotropic Nematic Network on a Non-contact Photoalignment Layer", A. E. A. Contoret, S. R. Farrar, P. O. Jackson, S. M. Khan, L. May, M. O'Neill, J. E. Nicholls, S. M. Kelly and G. J. Richards, Adv. Mater. 2000, 12, No. 13, July 5 p 971. This demonstrates that polarisation efficiencies of 11:1 can be achieved in practical systems.

Figure 17:
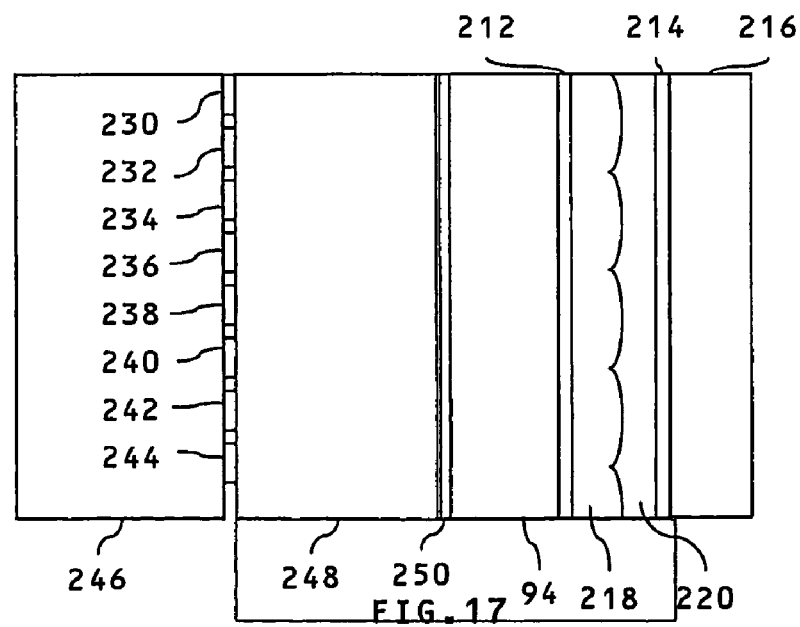
FIG. 17 shows an active lens autostereoscopic 3D display with a polarised emissive display.

FIG. 17 shows an embodiment of the present invention. An array of pixels 230-244 is formed on a display substrate 246. The substrate 246 may comprise an array of addressing thin film transistors and electrodes so that each of the pixels may be independently addressed with an electrical signal. The thin film transistors may be inorganic or may be embodied in organic materials. Alternatively, the pixels may be addressed by a passive addressing scheme in which addressing transistors need not be present at the pixels. Each of the pixels 23-244 comprises an emissive region in which the emissive material comprising chromophores is uniaxially aligned so that the polarisation of emission is substantially linear and substantially in the same orientation for the entire pixel. Each pixel is arranged to have substantially the same polarisation direction The emissive material may be a polymer electroluminescent material or a small molecule electroluminescent material for example. Means to produce polarised emission by aligning the molecules of the emitting material are known. A further cover substrate 248 is attached to the pixels. The substrate 248 may incorporate barrier layers and contrast enhancement black mask layers.

An optional polariser 250 may be attached to the substrate 248. Alternatively, polariser materials may be incorporated at or near to the pixel plane, on the inner surface of the substrate 248 for example.

For an example, one known polarised organic electroluminescent display has a polarisation ratio of 11:1. In combination with a typical polariser of polarisation efficiency 45%, the overall throughput from the light source will be 82.5%, compared to 45% for an unpolarised light source in combination with a clean-up polariser.

The active birefringent microlens 212-220 is formed on the surface of the polariser 250. In order to switch the output polarisation from the switch cell, a voltage is applied across the liquid crystal cell.

The apparatus of FIG. 17 operates in the following manner. The output polarisation from the polarised emissive pixel array 230-244 is cleaned by the linear polariser 250 which has a transmission direction parallel to the major axis of the polarisation direction of the emissive material. This polarisation state is aligned parallel to the alignment of the liquid crystal material in the birefringent lens 218 in its OFF state. This refractive index is different to the refractive index of the isotropic material 40, and thus there is a lens effect. In a second mode, the material 218 is realigned by the applied field so that there is substantially no index step to the isotropic material at the lens surface, and the lens has no optical function. This causes a change in the directional distribution of the optical output to the 2D mode. The lens may be arranged to produce an image of the pixel plane at a window plane.

Extending the Range of Optimum Operating Temperature

Considerations to extend the range of optimum operating temperature will now be described. These considerations apply to all the active birefringent lens arrays described above and indeed apply in general to any other active birefringent lens array operable in two modes by control of the voltage across electrodes.

The performance of the display may change with the operating temperature. This can be due to a variation in the ordinary and extraordinary refractive indices of the birefringent material and the refractive index of the isotropic material with temperature.

Figure 22:
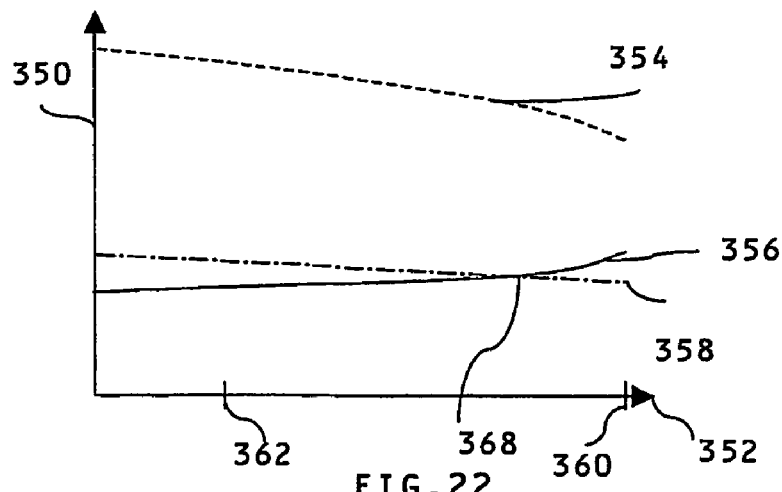
FIG. 22 shows schematically the variation of refractive indices with temperature for the lens materials.

The variation of refractive index 350 against temperature 352 for a typical combination of liquid crystal and polymer material is shown schematically in FIG. 22. The ordinary index 356 tends to increase as the nematic to isotropic transition temperature is approached while the extraordinary index 354 decreases. Above the nematic-isotropic transition temperature 360, the birefringent material indices become matched. The polymer index 358 may decrease with temperature, as shown.

The system shown in FIG. 22 shows the case of a typical material system in which the polymer index 356 is substantially matched to the ordinary index of the birefringent material for a positive dielectric anisotropy liquid crystal material. As described elsewhere in the present application, such a system typically requires a voltage to be applied to the cell to enable the 2D mode of operation in which the polymer and ordinary indices are substantially matched. In other material systems, the polymer index 356 may be substantially matched to the extraordinary index of the birefringent material, in which case the following considerations still apply mutatis mutandis.

The design operating temperature 362 is typically room temperature for example in the range of 20-25° C., and preferably 20° C.

The zero voltage index match point 368 at which the polymer index is equal to the ordinary index 356 may be chosen as a design parameter depending on the precise choice of materials. Typically the zero voltage index match point 368 is set at the design operating temperature. However, it has been appreciated that there is advantage in biassing the zero voltage index match point 368 to a higher temperature, as follows.

Firstly, there is a consideration that display apparatuses are used more often at temperatures above the normal design temperature of 20° C. Therefore raising the temperature at which the refractive index of the polymer material is exactly equal to the relevant one of the refractive indices of the birefringent material actually causes the refractive index of the polymer material to be closer to the relevant one of the refractive indices of the birefringent material over a greater proportion of the typical use of a display apparatus.

For a system in which the ordinary index 356 of the birefringent lens material is substantially matched to the polymer index 358 at the design temperature 362, the index matching condition may be lost as the temperature increases. This can be overcome by setting the polymer index between the ordinary and extraordinary indices at room temperature such that an acceptably low variation of intensity is seen at the window plane for the 2D mode. As the operating temperature rises, the liquid crystal ordinary index 356 rises towards the polymer index 358 so that the range of temperatures over which the a sufficiently close index matching condition to meet the 2D lens performance requirement is extended, for the typical range of desirable operating temperatures, as described above.

Figure 23:
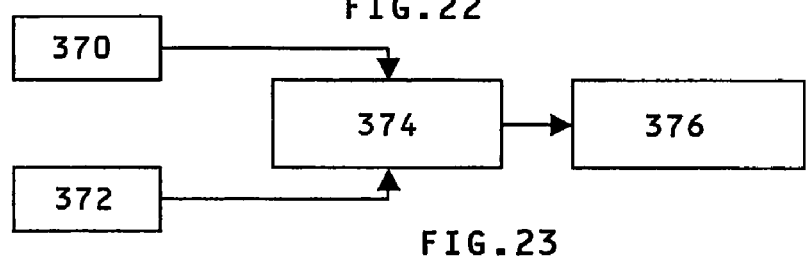
FIG. 23 shows a control apparatus for optimising lens cell driving voltage.

Secondly, there will now be described an apparatus, as shown in FIG. 23, which can be used to further compensate the performance of the device for variations in temperature. A temperature sensor 370 or a manual user adjustment 372 is used to set a voltage controller 374 which drives the voltage across the lens cell 376. A small voltage can thus be applied across the lens in the 2D mode. The manual user adjustment may be implemented through a direct electronic adjustment or through user input to a software application which controls the voltage.

The polymer index 358 is set between the ordinary refractive index 358 and the extraordinary refractive index 354 over a range of temperatures up to a limit which limit is above the design operating temperature 362, preferably at least 25° C. In this particular embodiment, the limit is the zero voltage index match point 368. Over this range of temperatures, the voltage controller 374 can compensate for the variation in temperature in the second mode (2D mode), thereby extending the effective temperature operating range.

Figure 24:
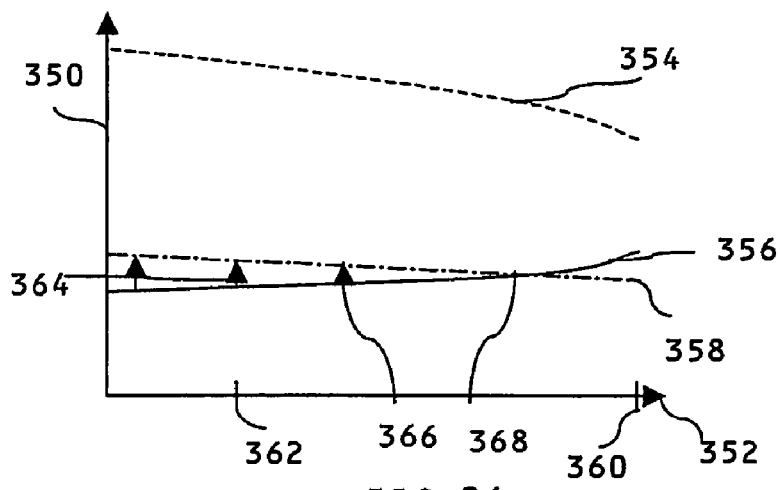
FIG. 24 shows schematically the control of effective lens refractive indices with temperature for the lens materials for the 2D mode.

FIG. 24 shows schematically the variation of refractive index in such a device. The effective refractive index is the resultant refractive index seen by the polarisation state passing through the birefringent lens to the observer. The effective refractive index is the resolved component of the ordinary and extraordinary refractive indices of the birefringent material. If a voltage is applied to the birefringent material, the material reorients so that the relative components of the ordinary and extraordinary refractive indices seen by the polarisation state varies, and thus the effective index varies.

In the example given, at the design operating temperature 362, the effective refractive index seen by the incident polarisation state as it passes through the lens is lower than the polymer index if a voltage is applied to fully switch the birefringent material.

If a reduced voltage is applied, the effective index seen by the polarisation will increase by an amount shown by the arrow 364, as the polarisation state starts to see a component of the extraordinary index of the birefringent material. If the polymer index 358 is set above the ordinary index of the liquid crystal at the standard operating temperature then the effective index in the lens can thus be controlled to match the polymer index 358 at the operating temperature.

If the voltage is adjusted to match the operating temperature across the temperature range, for example at the temperature shown by the arrow 366, then the operating temperature range of the second mode can be extended. At the temperature 368, no voltage is applied to achieve the index matching condition. The voltage signal 374 can be set by automatic feedback from a temperature sensor 370, or by manual correction by input 372 to optimise the display performance.

Figure 25:
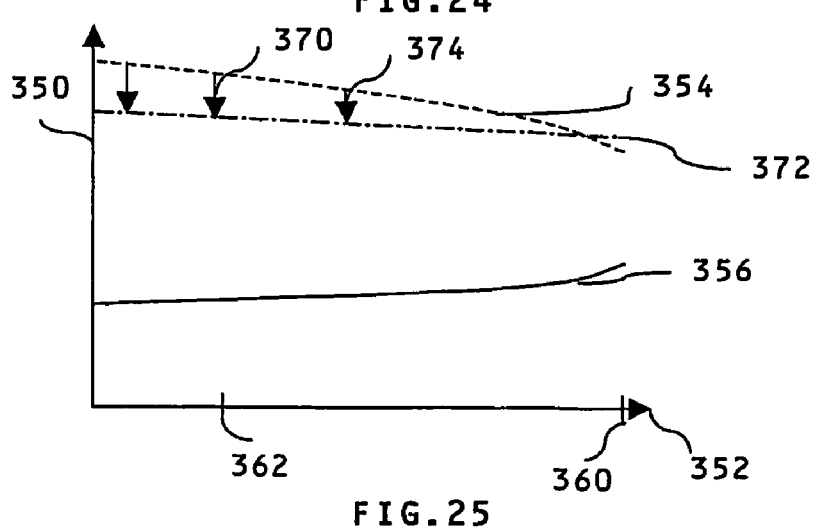
FIG. 25 shows schematically the control of effective lens refractive indices with temperature for the lens materials for the 3D mode.

Similarly, the operating temperature range in the first mode (3D mode) can be extended, as illustrated in FIG. 25. As the temperature 352 increases, the extraordinary index 354 of the material will reduce, thus reducing the lens optical power. The power of the lens array, which may be controlled by selection of the radius of curvature of the lenses, may be set to be greater than the power required for design temperature 362 operation at best focus of the spatial light modulator in the display apparatus over a range of temperatures up to a limit which limit is above the design operating temperature 362, preferably at least 25° C. Over this range of temperatures, the voltage controller 374 can compensate for the variation in temperature in the first mode (3D mode), thereby extending the effective temperature operating range.

In this particular embodiment, if no voltage is applied to the cell, the optical power of the lens is slightly higher than is required for optimum performance at room temperature. An adjusted voltage can be applied across the lens cell to achieve optimum lens operation. This is illustrated by the arrow 370, in which the effective index seen by the polarisation state in the lens falls to a locus of refractive index 372. As the temperature increases, the effective index in the lens will fall, so that the refractive index drop 374 required is smaller, and the driving voltage can be reduced to maintain the optical performance of the lens. The same control system as shown in FIG. 23 can be used to optimise the performance of the system by setting the best display focus. A calibration of best focus across the temperature range can be determined for the display prior to shipment to the end user.

The best focus of the lens is determined by the lens optical power and the separation of the lens from the pixel plane of the spatial light modulator.

The best focus of the lens can be defined for example as well known in the art as the paraxial focus, the minimum on-axis spot size, the field averaged spot size, the minimum on-axis root mean squared optical path difference, or the minimum field averaged root mean squared optical path difference. Alternatively, the best focus may be determined with respect to the size of the eye spot at the pixel plane (i.e. the size of the image of the nominal human pupil at the pixel plane). The best focus can generally be set by minimising the size of the eye spot. Alternatively the best focus may be different from the minimum eye spot size at the pixel plane. For example, the best focus eye spot size may be larger than the gap between the pixel columns so that the resultant spot serves to blur out intensity differences in the window plane due to imaging of the gaps between the columns. The best focus can alternatively be determined by visual observation of the display, so that the visual appearance of the fringe seen on the display surface as the observer moves laterally with respect to the display is optimised for best perceived appearance of the display. The best focus setting may be a user setting on the display, to allow users to vary the display appearance to best meet their personal preferences.

If the lens incorporates homeotropic alignment layers and a birefringent material with negative dielectric anisotropy, then the larger driving voltage is required for 3D operation. In this case, the 2D mode is optimised by increasing the driving voltage so that the effective index increases towards the polymer index. In the 3D mode, the driving voltage is reduced so that the effective index falls to obtain the best focus position.

The polymer index may also be set to be close to, but less than, the extraordinary index of the birefringent material. In this case, a small change in the effective index will produce the index match, whereas a reduction in the drive voltage can be used to increase the effective index in the 3D mode and so produce the index step for best focus.

In this way, the operating range of the display can be advantageously extended by setting the polymer index between the ordinary and extraordinary refractive indices.

Additionally, the operating temperature range of the 3D mode may be advantageously optimised by setting the lens radius of curvature to be smaller than for a corresponding lens optimised at the design operating temperature.

In the embodiments of the invention in which the lens incorporates twist may require further compensation. The amount of twist in the lens may be determined by the offset drive voltage. Thus, a small offset drive voltage may cause less twist in the lens than is present for no drive voltage. Alternatively, an offset of the maximum drive voltage may introduce twist that was not otherwise present. To remove the effects of twist, it may be desirable to use a waveplate to compensate for panel output polarisation direction. Alternatively, the design twist in the device could be set at manufacture to be optimised so that the correct resultant twist occurs in the lens cell at the design operating temperature when the offset voltage has been applied.

The invention claimed is:

1. A switchable birefringent lens array for a display apparatus producing a substantially linearly polarised output, the lens array comprising:

birefringent material arranged between a planar surface and a relief surface defining an array of cylindrical lenses; and electrodes for applying a control voltage across the birefringent material for electrically switching the birefringent material between a first mode and a second mode, the lens array being arranged in said first mode to modify the directional distribution of incident light polarised in a predetermined direction and in said second mode to have substantially no effect on incident light polarised in said predetermined direction, wherein:

in the first mode, at said relief surface the birefringent material is aligned substantially parallel to the geometrical axis of the cylindrical lenses; and in the first mode, at said planar surface the birefringent material is aligned parallel to the planar surface at a predetermined angle such that, in the first mode, the alignment direction twists between the planar surface and the relief surface.

2. A switchable birefringent lens array according to claim 1, further comprising an alignment layer at said planar surface for aligning the birefringent material parallel to the planar surface at said predetermined angle.

3. A switchable birefringent lens array according to claim 2, further comprising an alignment layer at said relief surface for aligning the birefringent material substantially parallel to the geometrical axis of the cylindrical lenses.

4. A switchable birefringent lens array according to claim 1, wherein the birefringent material is liquid crystal.

5. A switchable birefringent lens array according to claim 1, wherein the birefringent material is aligned homogeneously.

6. A switchable birefringent lens array according to claim 1, further comprising a substrate of substantially isotropic material adjacent the relief surface.

7. A switchable birefringent lens array according to claim 6, wherein the refractive index of the isotropic material is substantially equal to the ordinary refractive index of the birefringent material.

8. A display apparatus comprising: a display device arranged to produce a substantially linearly polarised output; and a switchable birefringent lens array according to any one of the preceding claims arranged with the output of the display device incident on the planar surface of the lens array, the birefringent material at the planar surface being aligned in a direction in cooperation with the direction in which the output of the display device is linearly polarised when incident on the lens array.

9. A display apparatus according to claim 8, wherein the birefringent material at the planar surface is aligned either parallel or orthogonal to the direction in which the output of the display device is linearly polarised.

10. A display apparatus according to claim 8, further comprising one or more waveplates arranged between the display device and the lens array to rotate the direction in which the output of the display device is polarised.

11. A switchable birefringent lens array for a display apparatus producing a substantially linearly polarised output, the lens array comprising:

birefringent material arranged between a surface at least one of which is a relief surface defining an array of cylindrical lenses; and electrodes for applying a control voltage across the birefringent material for electrically switching the birefringent material between a first mode and a second mode, wherein, when the control voltage is applied, the lens array is arranged in said first mode to modify the directional distribution of incident light polarised in a predetermined direction, and when substantially no control voltage is applied, the lens array is arranged in said second mode to have substantially no effect on incident light polarised in said predetermined direction, wherein the birefringent material is homeotropically aligned at said at least one relief surface.

12. A switchable birefringent lens array according to claim 11, wherein the birefringent material has a negative dielectric anisotropy.

13. A switchable birefringent lens array according to claim 11, wherein in the first mode the birefringent material is aligned at the at least one relief surface substantially parallel to the geometrical axis of the cylindrical lenses.

14. A switchable birefringent lens array according to claim 13, further comprising an alignment layer at said relief surface for aligning the birefringent material substantially parallel to the geometrical axis of the cylindrical lenses.

15. A switchable birefringent lens array according to claim 13, further comprising a grooved structure at said relief surface for aligning the birefringent material substantially parallel to the geometrical axis of the cylindrical lenses.

16. A switchable birefringent lens array according to claim 11, wherein the birefringent material is arranged between a said relief surface and a planar surface, and at said planar surface the alignment of the birefringent material is homeotropic.

17. A switchable birefringent lens array according to claim 11, wherein the birefringent material is arranged between a said relief surface and a planar surface, and at said planar surface the alignment of the birefringent material is homogeneous in the first mode and the second mode.

18. A switchable birefringent lens array according to claim 17, wherein at said planar surface the alignment of the birefringent material is homogeneous in the first mode and the second mode.

19. A switchable birefringent lens array according to claim 16, wherein the alignment of the birefringent material at said planar surface is at a predetermined angle such that in the first mode, the alignment direction twists between the planar surface and the relief surface.

20. A switchable birefringent lens array according to claim 16, further comprising an alignment layer at said planar surface for providing said alignment of the birefringent material at said planar surface.

21. A switchable birefringent lens array according to claim 11, wherein at said at least one relief surface the birefringent material is aligned, in combination, homeotropically and homogeneously.

22. A switchable birefringent lens array according to claim 11, wherein the birefringent material is liquid crystal.

23. A switchable birefringent lens array according to claim 11, further comprising a substrate of substantially isotropic material adjacent the relief surface.

24. A switchable birefringent lens array according to claim 23, wherein the refractive index of the isotropic material is substantially equal to the ordinary refractive index of the birefringent material.

25. A display apparatus comprising: a display device arranged to produce a substantially linearly polarised output; and a switchable birefringent lens array according to claim 11 arranged with the output of the display device incident on the planar surface of the lens array.

26. A display apparatus according to claim 25, wherein the birefringent material at the planar surface is aligned in the first mode in a direction in cooperation with the direction in which the output of the display device is linearly polarised when incident on the lens array.

27. A display device according to claim 26, wherein the birefringent material at the planar surface is aligned in the first mode either parallel or orthogonal to the direction in which the output of the display device is linearly polarised.

28. A display device according to claim 25, further comprising one or more waveplates arranged between the display device and the lens array to rotate the direction in which the output of the display device is polarised.

29. An active birefringent lens array apparatus for a display apparatus comprising:
a birefringent material and a substantially isotropic material having relief surface therebetween defining an array of lenses;
electrodes for applying a control voltage across the birefringent material for electrically switching the birefringent material between a first mode and a second mode, the lens array being arranged in said first mode to modify the directional distribution of incident light polarised in a predetermined direction and in said second mode to have substantially no effect on incident light polarised in said predetermined direction; and
a voltage controller for controlling the voltage across the electrodes to switch between the first and second mode, the voltage controller being arranged to adjust the voltage applied in the first and second mode to compensate for variations in the temperature of the lens array apparatus for adjusting refractive index of the birefringent material,
wherein the refractive index of the isotropic material is between the ordinary refractive index of the birefringent material and the extraordinary refractive index of the birefringent material at temperatures below a limit of at least 25° C.

30. An active birefringent lens array apparatus according to claim 29, further comprising a temperature sensor for sensing the temperature of the lens array apparatus, the voltage controller being arranged to adjust the voltage applied in the first and second mode to compensate for variations in the temperature of the lens array apparatus in response to the temperature sensed by the temperature sensor.

31. An active birefringent lens array apparatus according to claim 29, further comprising an input device for allowing a user to input a voltage adjustment, the voltage controller being arranged to adjust the voltage applied in the first and second mode in response to the voltage adjustment input to the input device.

32. An active birefringent lens array apparatus according to claim 29, wherein the refractive index of the isotropic material is closer to the ordinary refractive index of the birefringent material than the extraordinary refractive index of the birefringent material.

33. An active birefringent lens array apparatus according to claim 29, wherein the isotropic material is polymer material.

34. A display apparatus comprising:
an active birefringent lens array apparatus according to claim 29; and
a spatial light modulator arranged in series with the active birefringent lens array apparatus, wherein, at temperatures below a limit of at least 25° C., a power of the array of lenses in the first mode is greater than a power required for the array of lenses to provide the best focus of the spatial light modulator.

35. A display apparatus comprising:
an active birefringent lens array apparatus according to claim 29; and
a spatial light modulator arranged in series with the active birefringent lens array apparatus, wherein at temperatures below a limit of at least 25° C., a twist of the array of lenses in the first mode is greater than the twist required for the array of lenses to provide the best rotation of the output polarisation state of the spatial light modulator.

36. An active birefringent lens array apparatus for a display apparatus comprising:
a birefringent material and a substantially isotropic material having relief surface therebetween defining an array of lenses;
electrodes for applying a control voltage across the birefringent material for electrically switching the birefringent material between a first mode and a second mode, wherein, when the control voltage is applied, the lens array is arranged in said first mode to modify the directional distribution of incident light polarised in a predetermined direction, and when substantially no control voltage is applied, the lens array is arranged in said second mode to have substantially no effect on incident light polarised in said predetermined direction,
wherein the refractive index of the isotropic material is equal to one of the ordinary refractive index of the birefringent material or the extraordinary refractive index of the birefringent material at a temperature above 20° C.

37. An active birefringent lens array apparatus according to claim 36, wherein the isotropic material is polymer material.

* * * * *